United States Patent
Moore et al.

(10) Patent No.: US 11,030,973 B2
(45) Date of Patent: Jun. 8, 2021

(54) WEARABLE HEADS-UP DISPLAYS WITH AMBIENT LIGHT DETECTION AND ADJUSTABLE DISPLAY BRIGHTNESS

(71) Applicant: GOOGLE LLC, Mountain View, CA (US)

(72) Inventors: Joshua Moore, Elora (CA); Lloyd Frederick Holland, Kitchener (CA); Jonathan Blake Huras, Kitchener (CA); Charles Eiric Johnstone, Waterloo (CA); Jiwon Yang, Kitchener (CA); Victor Emile Isbrucker, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/568,532

(22) Filed: Sep. 12, 2019

(65) Prior Publication Data
US 2020/0082790 A1   Mar. 12, 2020

Related U.S. Application Data

(60) Provisional application No. 62/730,323, filed on Sep. 12, 2018.

(51) Int. Cl.
G09G 5/10 (2006.01)
G02B 27/01 (2006.01)
G06F 3/01 (2006.01)

(52) U.S. Cl.
CPC ............ *G09G 5/10* (2013.01); *G02B 27/0172* (2013.01); *G06F 3/013* (2013.01); *G02B 2027/0118* (2013.01); *G02B 2027/0174* (2013.01); *G02B 2027/0178* (2013.01); *G09G 2320/0626* (2013.01); *G09G 2360/141* (2013.01); *G09G 2360/144* (2013.01)

(58) Field of Classification Search
CPC ........................................................ G09G 5/10
USPC ........................................................ 345/207
See application file for complete search history.

(56) References Cited

U.S. PATENT DOCUMENTS

| | | | | |
|---|---|---|---|---|
| 2013/0113973 | A1* | 5/2013 | Miao | G09G 3/003 348/333.01 |
| 2016/0055822 | A1* | 2/2016 | Bell | G09G 5/10 345/207 |
| 2017/0323615 | A1* | 11/2017 | Hazra | G09G 3/002 |
| 2019/0043393 | A1* | 2/2019 | Cosendey | G02B 27/0172 |

* cited by examiner

*Primary Examiner* — Long D Pham

(57) ABSTRACT

Systems, devices, and methods for detecting ambient light with wearable heads-up displays are described. An ambient light sensor can be positioned close to a user's eye area on a user-side of a wearable heads-up display. By positioning the ambient light sensor on a user-side of the wearable heads up display, the ambient light sensor can be in a position and/or orientation which receives ambient light in a similar manner a user's eye, and thus ambient light detection can be more accurate. Brightness of display light output by the wearable heads-up display can be adjusted in response to the detected brightness of ambient light.

20 Claims, 20 Drawing Sheets

WEARABLE HEADS-UP DISPLAYS WITH AMBIENT LIGHT DETECTION AND ADJUSTABLE DISPLAY BRIGHTNESS

CROSS-REFERENCE TO RELATED APPLICATIONS

This application claims the benefit of U.S. Provisional Application No. 62/730,323, filed Sep. 12, 2018, titled "Systems, Devices, and Methods for Detecting Ambient Light in Wearable Heads-up Displays", the content of which is incorporated herein in its entirety by reference.

TECHNICAL FIELD

The present systems, devices, and methods generally relate to wearable heads-up displays and particularly relate to detecting ambient or environmental light with wearable heads-up displays.

BACKGROUND

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, and typically visible to others, and generally present for long periods of time, form factor (i.e., size, geometry, and appearance) is a major design consideration in wearable electronic devices.

Wearable Heads Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. However, optical performance and visibility of the display are relative, and are heavily influenced by the environment in which the display is being viewed. For example, if the user is in a dark room, even if the brightness of the display is low, the display can still be easy to see by a user, since there is minimal ambient light to interfere with and overpower the display light. However, if the display light is too bright, there may be too much contrast between the display and the environment, which can cause discomfort to the user or can cause the user's irises to contract, reducing the user's capability to see their environment. As another example, if the user is in a bright environment, such as outdoors on a sunny day, bright ambient light can interfere with and overpower the display light, such that the user cannot clearly see the display. In view of the above, there exists a need to provide effective means for determining ambient light in a user's environment in order to adjust the brightness of display light.

BRIEF SUMMARY

According to a broad aspect, the description describes a wearable heads-up display ("WHUD") which comprises a support structure; a transparent combiner carried by the support structure, the transparent combiner having a user-side which is to face an eye of a user when the WHUD is worn by the user and a world-side which is to face away from the eye of the user when the WHUD is worn by the user; a light engine carried by the support structure positioned and oriented to output display light towards the transparent combiner; and an ambient light sensor carried by a portion of the support structure which is faced by the user-side of the transparent combiner, wherein the transparent combiner is positioned and oriented to direct the display light towards the eye of the user.

The support structure may comprise a front frame to carry the transparent combiner in a field of view of the user's eye when the WHUD is worn by the user. The support structure may comprise at least a first arm coupled to the front frame to be positioned along a side of a user's head when the WHUD is worn by the user. The portion of the support structure which carries the ambient light sensor may comprise a protrusion on the first arm of the support structure.

The protrusion on the first arm of the support structure may carry at least a portion of the light engine.

The light engine may include an at least one visible laser light diode to output visible laser light in at least one visible narrow waveband. The transparent combiner may be a holographic optical element ("HOE") including a first hologram responsive to light within the visible narrow waveband and unresponsive to light outside of the visible narrow waveband, the first hologram positioned and oriented to receive visible laser light from the visible laser light diode and redirect the visible laser light towards the eye of the user.

The protrusion on the first arm of the support structure may have an opening to allow light to enter and exit the protrusion, the ambient light sensor may be able to receive ambient light which passes through the opening, and the light engine may be able to output the display light towards the transparent combiner through the opening.

The protrusion on the first arm of the support structure may carry an exit pupil replication optic positioned and oriented to split display light output by the light engine to the transparent combiner.

The WHUD may further comprise: an infrared light source carried by the support structure, the infrared light source positioned and oriented to output infrared light towards the eye of the user when the WHUD is worn by the user; an infrared light reflector carried by the transparent combiner positioned and oriented to receive infrared light reflected from the eye of the user and to redirect the received infrared light; and an infrared photodetector carried by the protrusion on the first arm of the support structure to capture the infrared light redirected by the infrared light reflector.

The infrared light source may output infrared light within a first narrow waveband, the infrared light reflector may comprise a hologram responsive to light within the first narrow waveband and unresponsive to light outside of the first narrow waveband, and the infrared photodetector may be responsive to light within the first narrow waveband and unresponsive to light outside of the first narrow waveband.

The transparent combiner may comprise a lightguide and an out-coupler, wherein the lightguide is positioned and oriented to receive the display light from the light engine and direct the display light to the out-coupler, and the out-coupler is positioned and oriented to redirect the display light towards the eye of the user.

The support structure may comprise a front frame to carry the transparent combiner in a field of view of the user's eye when the WHUD is worn by the user, the support structure may comprise at least one arm coupled to the front frame to be positioned on a side of a user's head when the WHUD is worn by the user, and the portion of the support structure which carries the ambient light sensor may comprise a flat plane substantially parallel to an axis which runs along a length of the at least one arm.

The ambient light sensor may be carried within the portion of the support structure which carries the ambient light sensor, and the support structure may have a first opening to allow light to enter into the portion of the support structure which carries the ambient light sensor.

The WHUD may further comprise an optical element protruding from the first opening. The optical element may comprise a convex lens, a prism, or a grating. The WHUD may further comprise a light pipe which guides light between the first opening and the ambient light sensor.

The WHUD may further comprise a proximity sensor carried within the portion of the support structure which is faced by the user-side of the transparent combiner, and the portion of the support structure which is faced by the user-side of the transparent combiner may comprise a second opening which allows light emitted by the proximity sensor to exit and re-enter the portion of the support structure which is faced by the user-side of the transparent combiner. The portion of the support structure which is faced by the user-side of the transparent combiner may comprise a monolithic wall which surrounds the first opening and the second opening. The portion of the support structure which is faced by the user-side of the transparent combiner may comprise a first window which covers the first opening and a second window which covers the second opening. The WHUD may further comprise a first light pipe which guides light between the first opening and the ambient light sensor; and a second light pipe which guides light between the second opening and the proximity sensor.

The support structure may have a general shape and appearance of eyeglasses.

In another broad aspect, the description describes a method of controlling a wearable heads-up display ("WHUD") having a light engine, a transparent combiner, and an ambient light sensor, the WHUD having or being communicatively coupled to at least one processor, the method comprising: receiving, by the ambient light sensor, ambient light which passes through the transparent combiner; determining, by the at least one processor, ambient brightness based on the ambient light received by the ambient light sensor; outputting, by the light engine, display light towards the transparent combiner, wherein brightness of the display light is determined by the at least one processor based on the ambient brightness; and redirecting, by the transparent combiner, the display light towards an eye of a user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
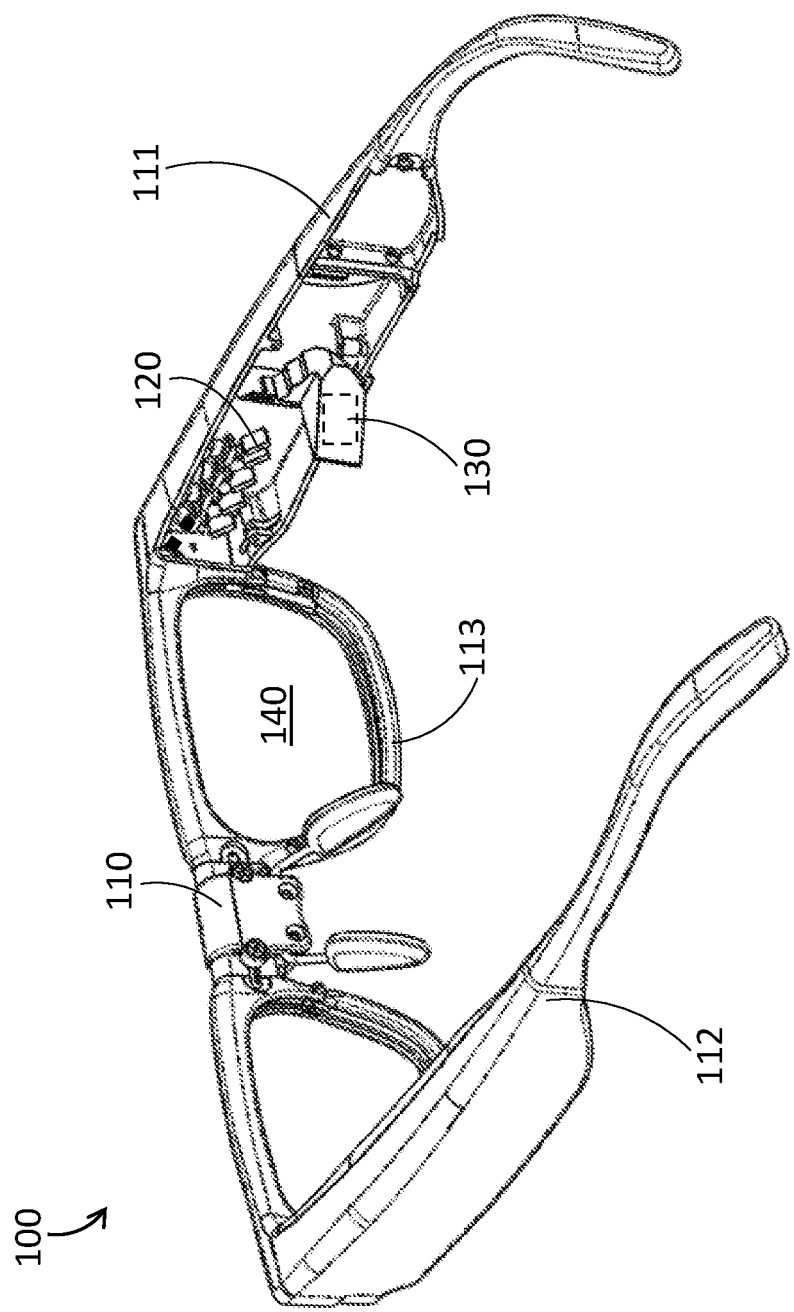
FIG. 1 is a partial-cutaway perspective diagram of an exemplary wearable heads-up display ("WHUD") in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Throughout the figures, several components are illustrated with dashed lines, to indicate that the respective component is not normally visible from the illustrated perspective of the drawing, but rather is contained within a housing of the device or otherwise occluded in the illustrated perspective. However, one skilled in the art will appreciate that any of the components illustrated with dashed lines need not be encased within a housing of the device, but could instead be located externally such as on the surface of the device.

The various implementations or embodiments described herein provide systems, devices, and methods for detecting ambient or environmental light with wearable heads-up displays. In response to detection of ambient light levels in a user's environment, brightness of a display in the wearable heads-up display can be adjusted, such as by reducing brightness when the environment has low levels of ambient light, or by increasing brightness when the environment has high levels of light. Detection of ambient light in a user's environment can be achieved by including an ambient light sensor on or in the wearable heads-up display. In order to adjust the brightness as accurately as possible, it is advantageous for the ambient light sensor to be positioned close to an eye of the user, and further advantageous for the ambient light sensor to be oriented to face a direction similar to a direction faced by the eye of the user. In this way, ambient light impingent on the ambient light sensor will closely represent ambient light that is impingent on the user's eye area. This is because there may be obstacles which block or restrict some of the ambient light which impinges on the user's eye, and thus an ambient light sensor which is positioned on, for example, the front of the wearable heads-up display may detect different ambient light than what actually reaches the user's eye. For example, the wearable heads-up display may have tinted, polarized, or other light-reducing lenses which restrict the amount of ambient light which impinges on the user's eye area. As another example, the frame of the wearable heads-up display may be thick and opaque, such that some ambient light is blocked from impinging on the user's eye area. As another example, an individual user's face may have features which block some ambient light from impinging on the user's eye area, such as prominent brow bones or long hair.

The present systems, devices and methods address the above issues by positioning an ambient light sensor close to a user's eye area, on a user-side of a front frame of the wearable heads up display. That is, an ambient light sensor can be positioned on a side of the wearable heads up display which is close to the user's face, instead of facing outward towards the environment. As used in the context of the present disclosure, "user-side" of a wearable heads-up display refers to a side of the wearable heads-up display which faces and/or is proximate to a user. Further, "world-side" as used herein refers to a side of a wearable heads-up display which faces away from a user, towards the user's environment. Optionally, some implementations discussed herein include an ambient light sensor which faces a direction similar to a direction faced by a user's eye.

FIG. 1 is a partial-cutaway perspective diagram of an exemplary wearable heads-up display ("WHUD") 100 in accordance with the present systems, devices, and methods. WHUD 100 includes a support structure 110 which includes a first arm 111, a second arm 112, and a front frame 113 which is physically coupled to first arm 111 and second arm 112. When worn by a user, first arm 111 is to be positioned on a first side of a head of the user, second arm 112 is to be positioned on a second side of a head of a user opposite the first side of the head of the user, and front frame 113 is to be positioned on a front side of the head of a user. First arm 111 carries a light engine 120 which outputs light representative of display content to be viewed by a user. First arm 111 also carries an ambient light sensor 130 on a user-side of WHUD 100, which detects ambient light. First arm 111 may also optionally carry several additional components of WHUD 100, as will be discussed in more detail later. Front frame 113 carries a transparent combiner 140 which receives light output from the light engine 120 and redirects this light to form a display to be viewed by a user.

Light engine 120 and transparent combiner 140 can include any appropriate display architecture for outputting light and redirecting the light to form a display to be viewed by a user. For example, light engine 120 could include at least one of a projector, a scanning laser projector, a micro-display, a white-light source, or any other display technology as appropriate for a given application. Transparent combiner 140 could include at least one holographic optical element, optical waveguide, liquid crystal display, diffraction grating, reflector array, refractor array, or any other light-redirection technology as appropriate for a given application. Transparent combiner 140 can be transparent or semi-transparent to allow at least some ambient light to pass therethrough. Exemplary display architectures could include for example scanning laser projector and holographic optical element combinations, side-illuminated optical waveguide displays, pin-light displays, or any other wearable heads-up display technology as appropriate for a given application. Exemplary display architectures are described in at least U.S. Non-Provisional patent application Ser. No. 15/145, 576, U.S. Non-Provisional patent application Ser. No. 15/167,458, or U.S. Non-Provisional patent application Ser. No. 15/046,254 now published as U.S. Pat. No. 9,989,764. Alternative terms for "light engine" as used herein could include light source, projector, display light engine, display output, or any other appropriate terminology. Alternative terms for "transparent combiner" as used herein can include optical combiner, holographic optical element, holographic combiner, or any other appropriate terminology.

Several exemplary WHUDs are described below, which further illustrate various features of the present systems, devices, and methods. One skilled in the art will appreciate that the specific features described in the below implementations can be combined as appropriate, such that the present disclosure is not restricted to only the implementations discussed below, but also includes any reasonable combination of the features of the implementations discussed herein. Further, to avoid obscuring the illustrated features, each of FIGS. 2, 3, 4, 5, 6, 7, 8, 9, 10, and 11 discussed below shows a partial view of a WHUD which only includes the right half of the WHUD, that is, a first arm and the right half of a front frame, and the components carried thereby. One skilled in the art will appreciate that each of these WHUDs can also include a second arm similar to second arm 112 of WHUD 100, and that each front frame can span horizontally across a user's entire face to carry a transparent combiner or lens in the field of view of the user's left eye as well. One skilled in the art will also appreciate that the orientation of the discussed components can be flipped, such that each of the components carried by the first arm are instead carried by a second arm on the opposite side of a user's head, and the components carried by one side of the front frame can instead be carried by the other side of the front frame. Essentially, each WHUD discussed herein can be reversed, such that all of the functionality described for the right side and right eye can be implemented on the left side for the left eye. Further, one skilled in the art will appreciate that a left side of each WHUD described herein can be a duplicate of the right side, thereby creating a display for each eye. One skilled in the art will also appreciate that each of the discussed implementations can also encompass a monocular WHUD which includes only a single arm and a front frame which is to be positioned in front of a single eye of a user.

Figure 2:
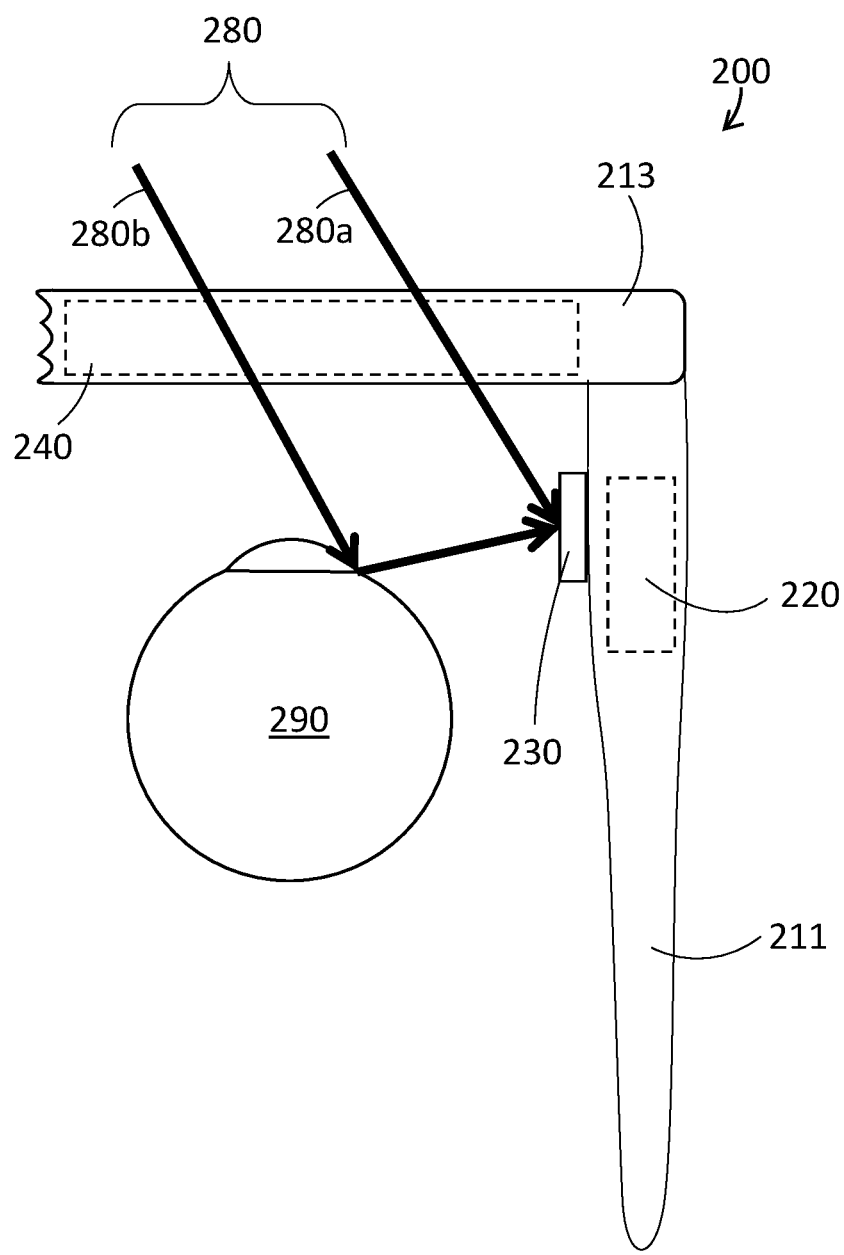
FIG. 2 is a partial top view of a WHUD which has an ambient light sensor carried thereon.

FIG. 2 is a partial top view of a WHUD 200 positioned relative to a user eye 290 in accordance with an exemplary implementation. Similar to WHUD 100, WHUD 200 includes a support structure which includes a first arm 211 and a front frame 213 physically coupled to first arm 211. First arm 211 carries light engine 220 and ambient light sensor 230. Front frame 213 carries transparent combiner 240. Further, although not explicitly illustrated in FIG. 2 to reduce clutter, WHUD 200 can also include at least one processor communicatively coupled to each of the electrical components in WHUD 200, including but not limited to light engine 220 and ambient light sensor 230. The at least one processor can be any suitable component which can execute instructions or logic, including but not limited to a micro-controller, microprocessor, multi-core processor, integrated-circuit, ASIC, FPGA, programmable logic device, or any appropriate combination of these components. Further still, although not explicitly illustrated in FIG. 2 to reduce clutter, WHUD 200 can also include a non-transitory processor-readable medium communicatively coupled to the at least one processor. The non-transitory processor-readable medium can have processor readable instructions thereon, which when executed by at least one processor can cause light engine 220 to output light representative of display content to be viewed by a user. The output light representative of display content to be viewed by a user is redirected by transparent combiner 240 towards an eye 290 of the user, such that the user can see the display content. Further, the non-transitory processor-readable medium may store processor readable instructions thereon, which when executed by at least one processor can cause the at least one processor to execute any number of functions, including receiving user input, managing user interfaces, generating display content to be presented to a user, receiving and managing data from any sensors carried by WHUD 200, receiving and processing external data and messages, and/or any other functions as appropriate for a given application. The non-transitory processor-readable medium can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

In FIG. 2, ambient light sensor 230 is carried on a user-side of WHUD 200. That is, ambient light sensor 230 is carried by a portion of first arm 211 which is faced by the user side of transparent combiner 240. In the case of FIG. 2, ambient light sensor 230 is carried on a surface of first arm 211 which generally faces towards a head of the user when worn. The portion of the first arm which carries the ambient light sensor 230 can be a substantially flat plane which is substantially parallel to an axis that runs along the length of the at least one arm. Stated simply, ambient light sensor 230 can be carried on a generally flat surface of first arm 211, such that ambient light sensor 230 is generally parallel to first arm 211. When WHUD 200 is worn by a user, ambient light 280 passes through transparent combiner 240 and impinges on a user eye 290. At least some of the ambient light will also impinge on ambient light sensor 230, directly or indirectly. In the case of FIG. 2, some ambient light 280a will pass through transparent combiner 240 and impinge directly on ambient light sensor 230. Some ambient light 280b will pass through transparent combiner 240, reflect off the user eye 290, then impinge on ambient light sensor 230.

As discussed above, by positioning ambient light sensor 230 on a user-side of WHUD 200, the accuracy of ambient light detection can be improved, by limiting light impingent on the ambient light sensor to light which actually enters the eye area of the user.

Based on the amount of light which impinges on ambient light sensor 230, brightness of light output by light engine 220 can be adjusted. For example, if very little light is impingent on ambient light sensor 230, brightness of light output by light engine 220 can be adjusted to be low. As another example, if a large amount of light is impingent on ambient light sensor 230, brightness of light output by light engine 220 can be adjusted to be high. This brightness adjustment can be achieved for example by at least one processor executing processor-executable instructions to analyze data captured by ambient light sensor 230 and modify output power of light engine 220 based on the data captured by ambient light sensor 230.

Figure 3:
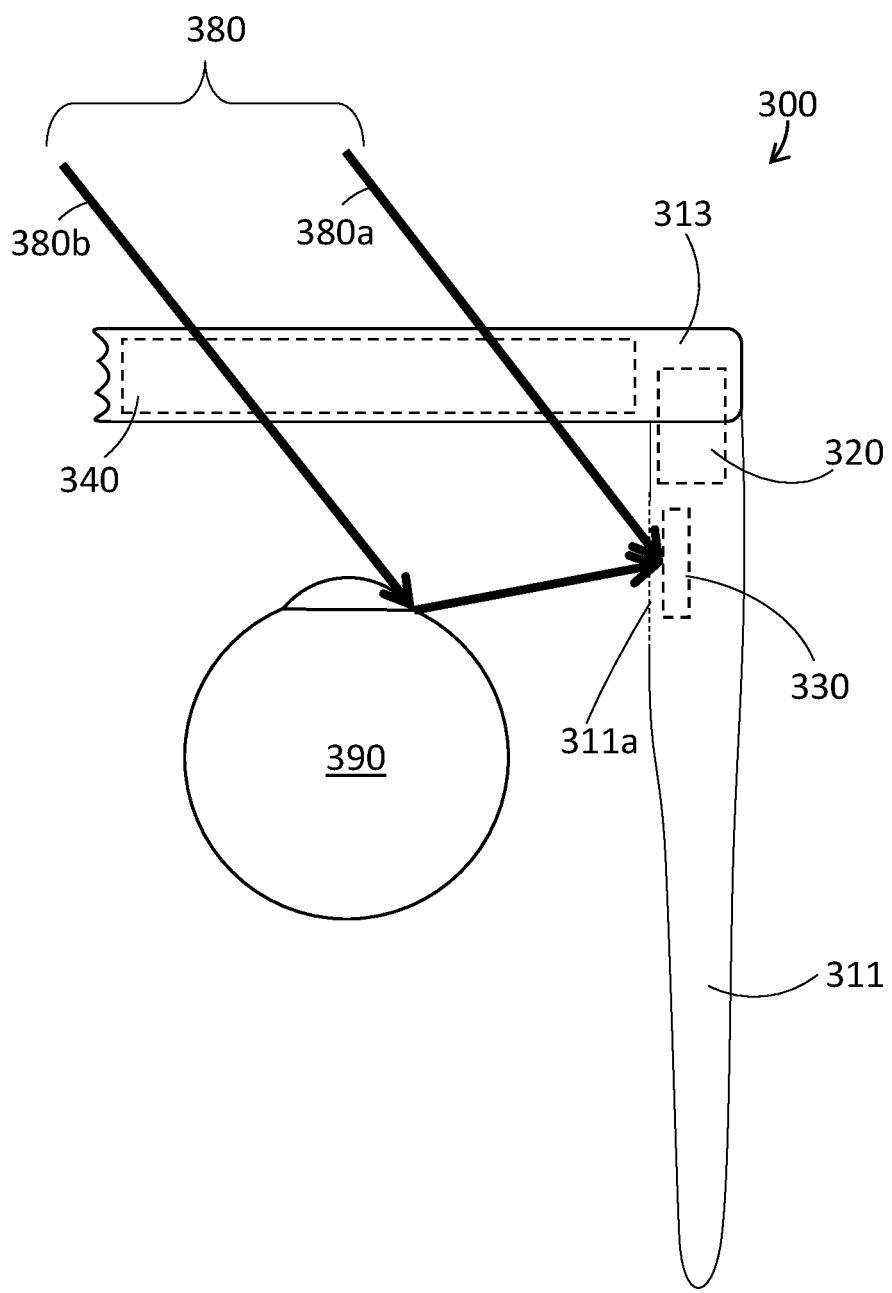
FIG. 3 is a partial top view of a WHUD which has an ambient light sensor carried therein.

FIG. 3 is a partial top view of a WHUD 300 positioned relative to a user eye 390 in accordance with an exemplary implementation. WHUD 300 is similar in some respects to WHUD 200 illustrated in FIG. 2, and one skilled in the art will appreciate that much of the description regarding FIG. 2 is applicable to FIG. 3. In particular, WHUD 300 as illustrated in FIG. 3 includes first arm 311 physically coupled to front frame 313, and WHUD 300 carries light engine 320, ambient light sensor 330, and transparent combiner 340. Though not explicitly illustrated, WHUD 300 may also include at least one processor and a non-transitory processor-readable storage medium similar to WHUD 200.

A first difference between FIG. 3 and FIG. 2 is that ambient light sensor 330 is carried within first arm 311 in FIG. 3. Consequently, first arm 311 includes an opening 311a which allows light to enter into first arm 311 to impinge on ambient light sensor 330. When WHUD 300 is worn by a user, ambient light 380 passes through transparent combiner 340 and impinges on user eye 390. At least some of the ambient light will pass through opening 311a and impinge on ambient light sensor 330, directly or indirectly. In the case of FIG. 3, some ambient light 380a will pass through transparent combiner 340 and opening 311a, and impinge directly on ambient light sensor 330. Some ambient light 380b will pass through transparent combiner 340, reflect off the user eye 390, then pass through opening 311a and impinge on ambient light sensor 330.

Opening 311a may be open and uncovered, or opening 311a may be covered by a transparent or semi-transparent window. Such a window can protect the ambient light sensor 330 and any other components in the first arm 311 from dust and external contamination. Such a window may also be more aesthetically appealing than just an opening, by creating an even surface which at least partially disguises the ambient light sensor 330 and any other components in the first arm 311. Further, the window may be colored or tinted to better blend into the other surfaces of the WHUD 300 and thus to better hide the components within the first arm 311. Tinting or coloring of the window could be compensated for by calibrating the ambient light sensor or instructions executed by the at least one processor to account for the reduced ambient light passing through the opening due to the tinting or coloring. Further, a light pipe may be included which guides light between opening 311a and ambient light sensor 330.

A second difference between FIG. 3 and FIG. 2 is the position of light engine 320. In particular, light engine 320 is illustrated as spanning across first arm 311 and front frame 313. One skilled in the art will appreciate that the position and construction of light engines are quite flexible within the scope of the present disclosure, and that the light engine in any given implementation can be carried entirely by a first arm, entirely by a front frame, or carried partially by a first arm and partially by a front frame. Further, one skilled in the art will appreciate that the light engine in any given implementation can be of unitary construction, such that all of the components of the light engine are contained together. Further still, one skilled in the art will appreciate that the light engine in any given implementation can be constructed of discrete components, such that components of the light engine can be positioned separately, and can even be carried by different portions of a given support structure.

Figure 4:
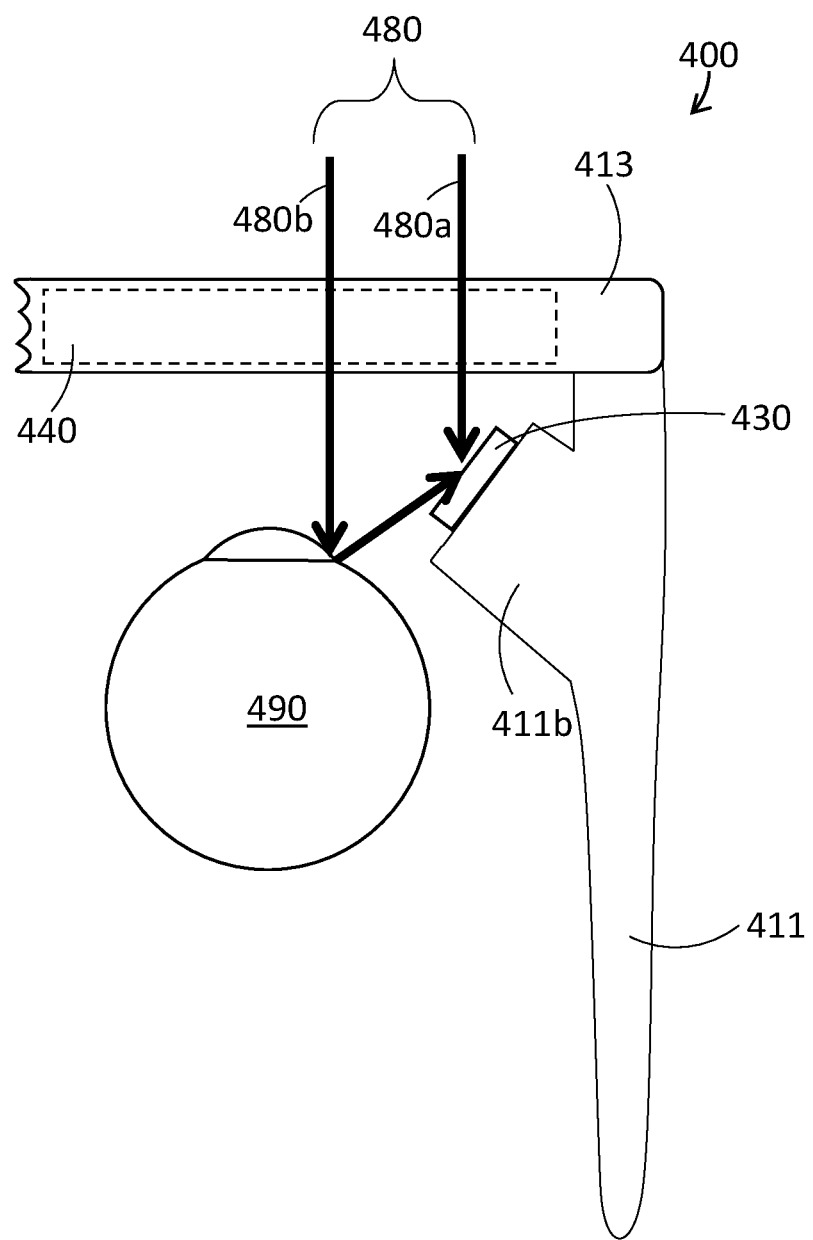
FIG. 4 is a partial top view of a WHUD which includes a protrusion which carries an ambient light sensor thereon.

FIG. 4 is a partial top view of a WHUD 400 positioned relative to a user eye 490 in accordance with an exemplary implementation. WHUD 400 is similar in some respects to WHUD 200 illustrated in FIG. 2, and one skilled in the art will appreciate that most of the description regarding FIG. 2 is applicable to FIG. 4. In particular, WHUD 400 as illustrated in FIG. 4 includes first arm 411 physically coupled to front frame 413, and WHUD 400 carries ambient light sensor 430 and transparent combiner 440. Though not explicitly illustrated, WHUD 400 may also include at least one processor and a non-transitory processor-readable storage medium similar to that in WHUD 200. Further, WHUD 400 may also include a light engine similar to that in WHUD 200 of FIG. 2, but such a light engine is not explicitly illustrated in FIG. 4 to reduce clutter. Instead, several alternative implementations of light engines are shown in FIGS. 6, 7, 8, and 9 as discussed later.

One difference between FIG. 4 and FIG. 2 is that ambient light sensor 430 is carried by a protrusion 411b on first arm 411. Protrusion 411b protrudes outward from a user-side surface of first arm 411, such that ambient light sensor 430 carried by protrusion 411b is closer to a position of user eye 490, and thus ambient light detected by ambient light sensor 430 will more closely represent ambient light which is impingent on user eye 490. Additionally, protrusion 411b can carry ambient light sensor 430 on a surface which is angled towards transparent combiner 440, as shown in FIG. 4. In this way, ambient light sensor 430 will face a direction which is similar to the direction faced by user eye 490, and thus ambient light detected by ambient light sensor 430 will more closely represent ambient light which is impingent on user eye 490.

Figure 5:
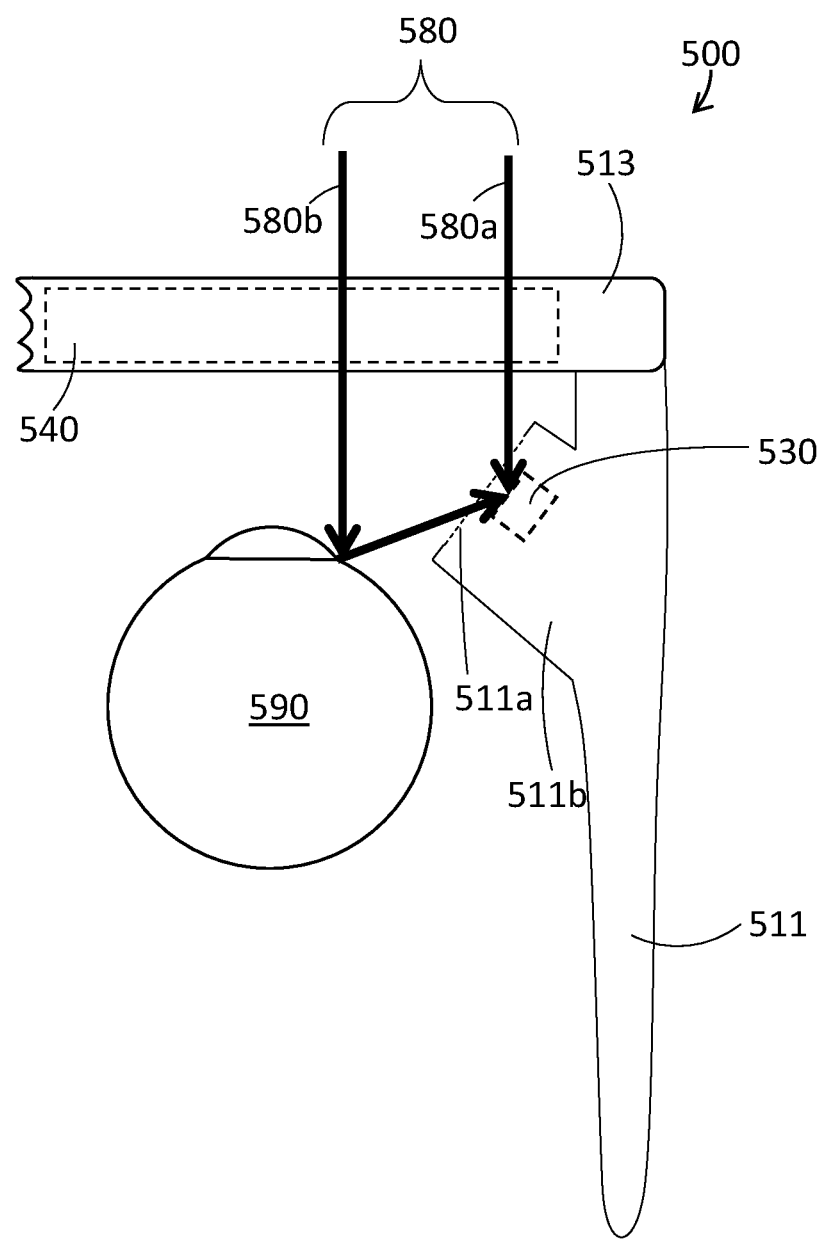
FIG. 5 is a partial top view of a WHUD which includes a protrusion which carries an ambient light sensor therein.

FIG. 5 is a partial top view of a WHUD 500 positioned relative to a user eye 590 in accordance with an exemplary implementation. WHUD 500 is similar in some respects to WHUD 400 illustrated in FIG. 4, and one skilled in the art will appreciate that much of the description regarding FIG. 4 is applicable to FIG. 5. In particular, WHUD 500 as illustrated in FIG. 5 includes first arm 511 physically coupled to front frame 513, first arm 511 having a protrusion 511b which carries ambient light sensor 530, and front frame 513 carrying transparent combiner 540. Though not explicitly illustrated, WHUD 500 may also include at least one processor and a non-transitory processor-readable storage medium similar to that in WHUD 200 in FIG. 2. Further, WHUD 500 may also include a light engine similar to that in WHUD 200 of FIG. 2, but such a light engine is not explicitly illustrated in FIG. 5 to reduce clutter. Instead, several alternative implementations of light engines are shown in FIGS. 6, 7, 8, and 9 as discussed later.

One difference between FIG. 5 and FIG. 4 is that ambient light sensor 530 is carried within protrusion 511b on first arm 511 in FIG. 5, similarly to ambient light sensor 330 in FIG. 3. Consequently, protrusion 511b includes an opening 511a which allows light to enter into protrusion 511b to impinge on ambient light sensor 530, similar to opening 311a in FIG. 3. When WHUD 500 is worn by a user, ambient light 580 passes through transparent combiner 540 and impinges on user eye 590. At least some of the ambient light will pass through opening 511a and impinge on ambient light sensor 530, directly or indirectly. In the case of FIG. 5, some ambient light 580a will pass through transparent combiner 540 and opening 511a and impinge directly on ambient light sensor 530. Some ambient light 580b will pass through transparent combiner 540, reflect off the user eye 590, then pass through opening 511a and impinge on ambient light sensor 530.

Opening 511a may be open and uncovered, or opening 511a may be covered by a transparent or semi-transparent window, similar to opening 311a in FIG. 3. One skilled in the art will appreciate that all of the features discussed regarding a window which covers opening 311a are applicable to a window which covers opening 511a, or any of the other windows discussed herein. Similarly, one skilled in the art will appreciate that a light pipe which guides light between opening 311a and ambient light sensor 330 could also be included in the opening-ambient light sensor implementation of FIG. 5, or any other opening-ambient light sensor implementations described herein.

Figure 6:
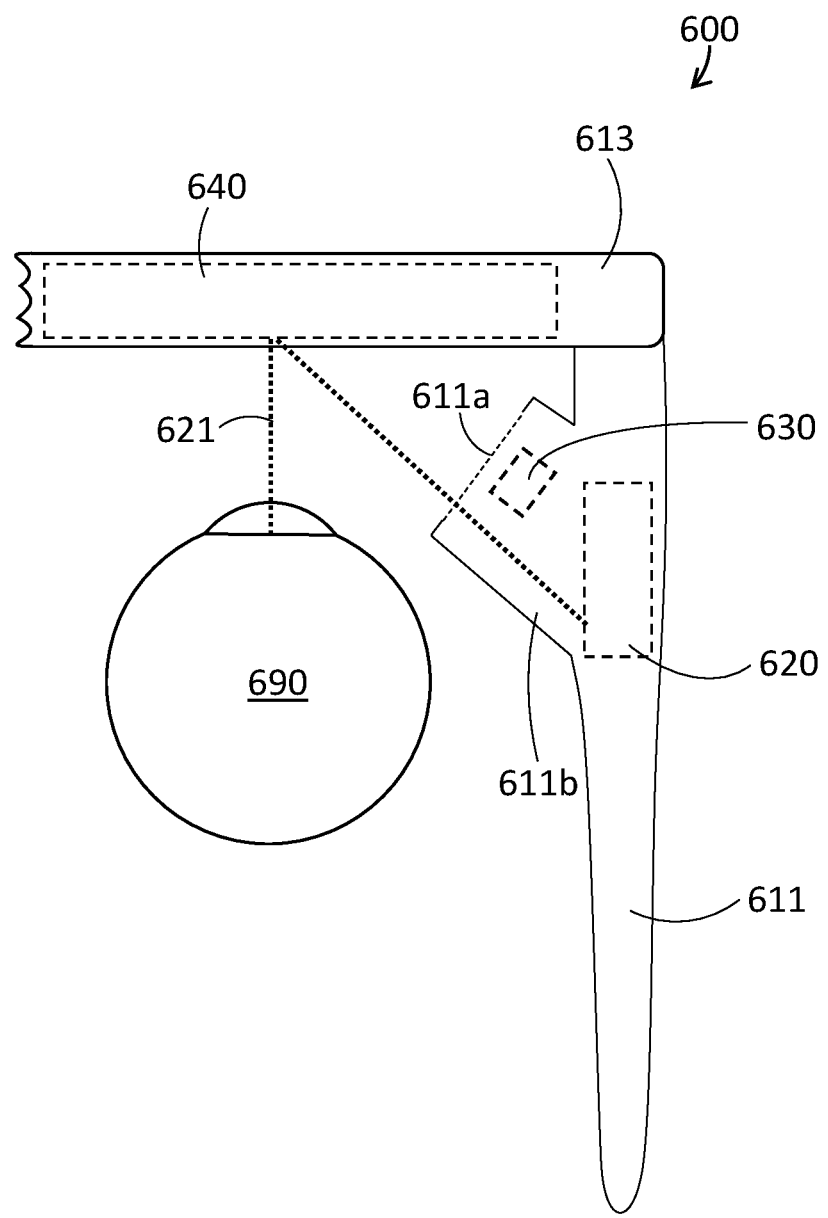
FIG. 6 is a partial top view of a WHUD which includes an exemplary light engine.

FIG. 6 is a partial top view of a WHUD 600 positioned relative to a user eye 690 in accordance with an exemplary implementation. WHUD 600 is based on WHUD 500 illustrated in FIG. 5, and FIG. 6 adds further details regarding positioning and functionality of a light engine on WHUD 600. One skilled in the art will appreciate that the description regarding FIG. 5 is applicable to FIG. 6. In particular, WHUD 600 as illustrated in FIG. 6 includes first arm 611 physically coupled to front frame 613, first arm 611 having a protrusion 611b which carries ambient light sensor 630, and front frame 613 carrying transparent combiner 640. Protrusion 611b also includes an opening 611a to allow light to pass therethrough. Though not explicitly illustrated, WHUD 600 may also include at least one processor and a non-transitory processor-readable storage medium similar to that in WHUD 200 in FIG. 2. To avoid clutter, FIG. 6 does not explicitly illustrate ambient light, but the descriptions relating to ambient light in FIG. 5 are applicable to FIG. 6.

Figure 7:
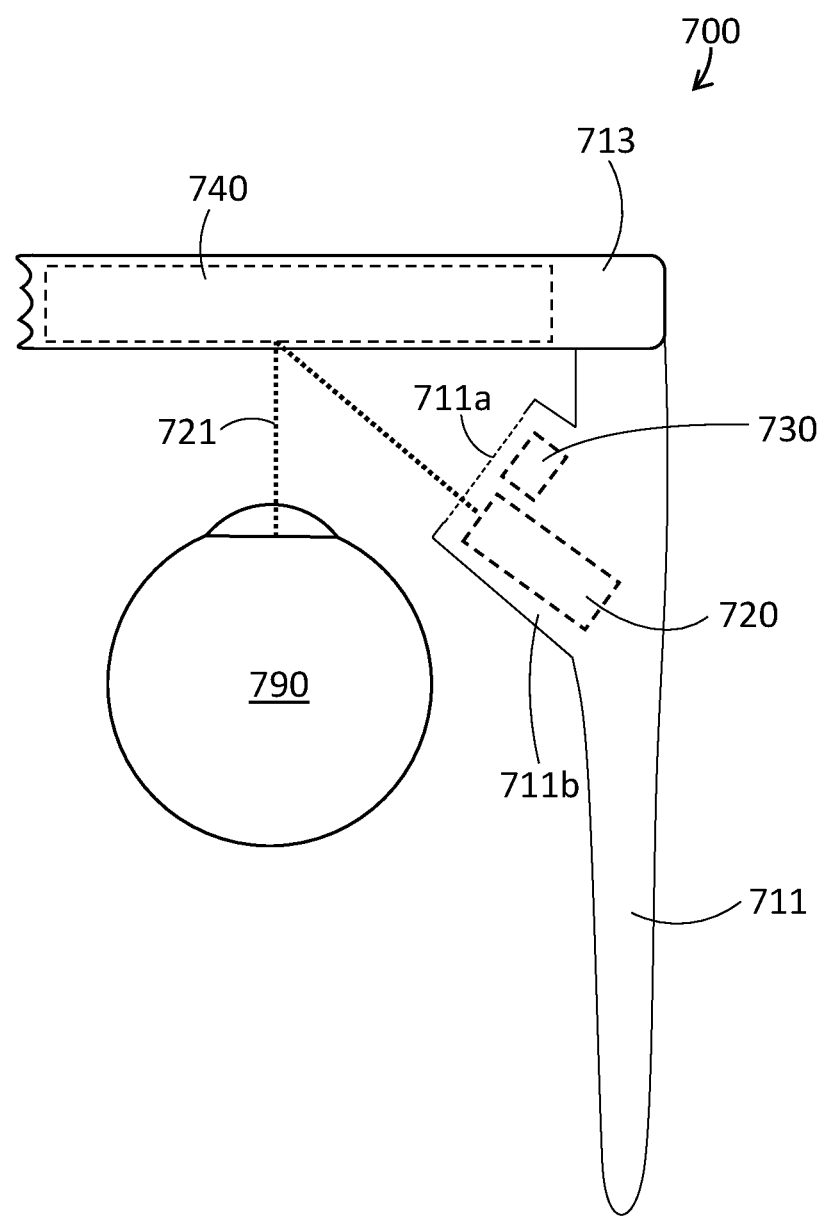
FIG. 7 is a partial top view of a WHUD which includes an alternative light engine.
Figure 8:
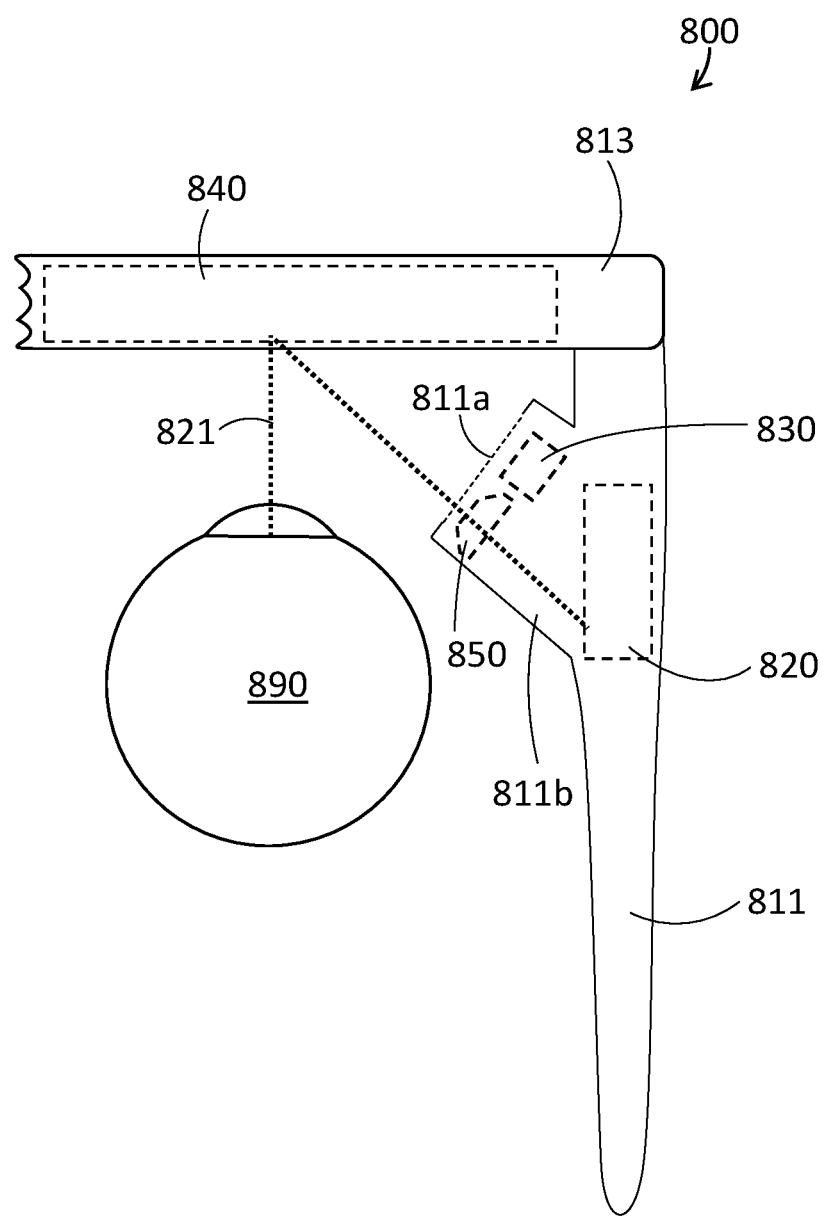
FIG. 8 is a partial top view of a WHUD which includes an exemplary optical expander.
Figure 9:
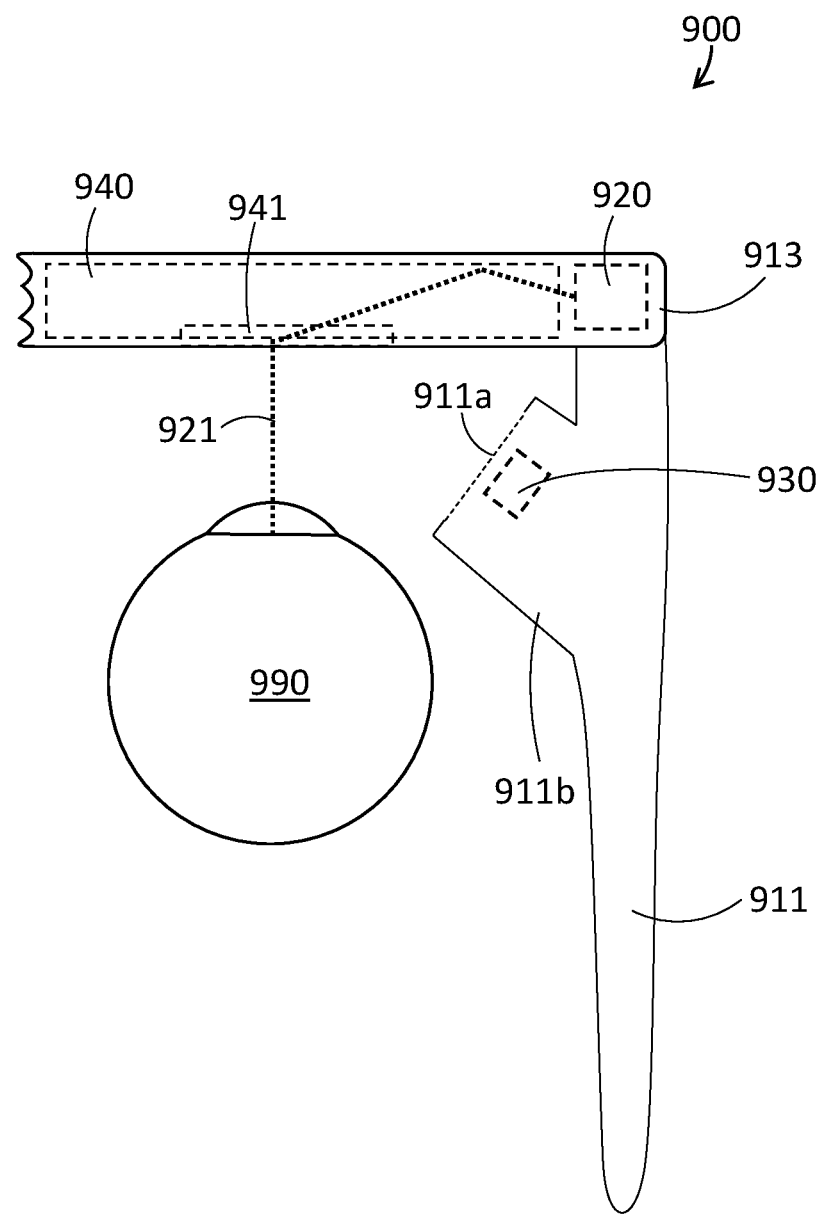
FIG. 9 is a partial top view of a WHUD which includes an alternative display architecture.

FIG. 6 shows light engine 620 carried by first arm 611. FIG. 6 shows light engine 611 being carried within the main body of first arm 611, that is, not in protrusion 611b. However, one skilled in the art will appreciate that light engine 620 can be carried in any position as appropriate for a given application. Several examples are illustrated in FIGS. 7, 8, and 9 which are discussed later. Light engine 620 outputs display light 621 towards transparent combiner 640 through opening 611a. Transparent combiner 640 redirects display light 621 towards user eye 690, thereby enabling WHUD 600 to display content to a user. As a non-limiting example, light engine 620 could comprise a red laser diode which outputs red laser light in a first narrow waveband, a green laser diode which outputs green laser light in a second narrow waveband different from the first narrow waveband, and a blue laser diode which outputs blue laser light in a third narrow waveband different from the first narrow waveband and the second narrow waveband. Transparent combiner 621 could comprise a holographic optical element which includes a first hologram responsive to light in the first narrow waveband, a second hologram responsive to light in the second narrow waveband, and a third hologram responsive to light in the third narrow waveband, such that the holographic optical element will reflect each of the red laser light, green laser light, and blue laser light from light engine 620 towards user eye 690. One skilled in the art will appreciate that the above example of laser diodes and holograms is merely exemplary, and WHUD 600 could include less than three laser diodes and less than three holograms, or could include a different display architecture, such as that in FIG. 9, for example.

FIG. 7 is a partial top view of a WHUD 700 positioned relative to a user eye 790 in accordance with an exemplary implementation. WHUD 700 is similar in some respects to WHUD 600 illustrated in FIG. 6, and FIG. 7 presents an alternative positioning of a light engine on a WHUD. One skilled in the art will appreciate that the description regarding FIG. 6 is applicable to FIG. 7. In particular, WHUD 700 as illustrated in FIG. 7 includes first arm 711 physically coupled to front frame 713, first arm 711 having a protrusion 711b which carries ambient light sensor 730, and front frame 713 carrying transparent combiner 740. Protrusion 711b also includes an opening 711a to allow light to pass therethrough. Though not explicitly illustrated, WHUD 700 may also include at least one processor and a non-transitory processor-readable storage medium similar to that in WHUD 200 in FIG. 2. To avoid clutter, FIG. 7 does not explicitly illustrate ambient light, but the descriptions relating to ambient light in FIG. 5 are applicable to FIG. 7.

One difference between FIG. 7 and FIG. 6 is that in FIG. 7, light engine 720 is shown as being carried at least partially by protrusion 711b. One skilled in the art will appreciate that in some implementations, light engine 720 can be completely carried by protrusion 711b. Similar to in FIG. 6, light engine 720 can output display light 721 toward transparent combiner 740 through opening 711a, and transparent combiner 740 can redirect the display light 721 towards an eye of a user 790 to form a display.

FIG. 8 is a partial top view of a WHUD 800 positioned relative to a user eye 890 in accordance with an exemplary implementation. WHUD 800 is similar in some respects to WHUD 600 illustrated in FIG. 6, where WHUD 800 includes additional optics. One skilled in the art will appreciate that the description regarding FIG. 6 is applicable to FIG. 8. In particular, WHUD 800 as illustrated in FIG. 8 includes first arm 811 physically coupled to front frame 813, first arm 811 having a protrusion 811b which carries ambient light sensor 830, and front frame 813 carrying transparent combiner 840. Protrusion 811b also includes an opening 811a to allow light to pass therethrough. Though not explicitly illustrated, WHUD 800 may also include at least one processor and a non-transitory processor-readable storage medium similar to that in WHUD 200 in FIG. 2. To avoid clutter, FIG. 8 does not explicitly illustrate ambient light, but the descriptions relating to ambient light in FIG. 5 are applicable to FIG. 8.

One difference between FIG. 8 and FIG. 6 is that FIG. 8 adds an optical expander 850. Light engine 820 outputs display light 821 towards optical expander 850, which in turn expands, spreads, magnifies, splits, replicates, or performs any other appropriate optical expansion on the display light 821, and outputs the display light 821 towards the transparent combiner 840 through opening 811a. For example, optical expander could be a magnification lens which expands display light 821 to cover more area when display light 621 impinges on transparent combiner 840. As another example, optical expander 850 could comprise an optical splitter, which splits the display light 621 into different areas, to be redirected by different areas of the transparent combiner 840. As another example, optical expander 850 could comprise an exit pupil replication optic, which replicates portions of display light 821 to be redirected by respective portions of transparent combiner 840 towards user eye 890, resulting in a plurality of exit pupils being projected at the user eye 890. Exemplary optical splitters and exit pupil replication optics are described in at least U.S. Non-Provisional patent application Ser. No. 15/970,631, U.S. Non-Provisional patent application Ser. No. 15/046,269, and U.S. Non-Provisional patent application Ser. No. 15/046,254.

FIG. 9 is a partial top view of a WHUD 900 positioned relative to a user eye 990 in accordance with an exemplary implementation. WHUD 900 is based on WHUD 500 illustrated in FIG. 5, and FIG. 9 adds further details regarding an alternative positioning and functionality of a light engine on WHUD 900. One skilled in the art will appreciate that the description regarding FIG. 5 is applicable to FIG. 9. In particular, WHUD 900 as illustrated in FIG. 9 includes first arm 911 physically coupled to front frame 913, first arm 911 having a protrusion 911b which carries ambient light sensor 930, and front frame 913 carrying transparent combiner 940. Protrusion 911b also includes an opening 911a to allow light to pass therethrough. Though not explicitly illustrated, WHUD 900 may also include at least one processor and a non-transitory processor-readable storage medium similar to that in WHUD 200 in FIG. 2. To avoid clutter, FIG. 9 does not explicitly illustrate ambient light, but the descriptions relating to ambient light in FIG. 5 are applicable to FIG. 9.

FIG. 9 shows light engine 920 carried by front frame 913. Light engine 920 outputs display light 921 into a periphery of transparent combiner 940. In turn, transparent combiner 940 acts as a lightguide which guides display light 921 therethrough, for example by total internal reflection, until display light 921 impinges on at least one out-coupler 941. The at least one out-coupler 941 then redirects display light 921 towards user eye 990, such that the user can see the display content represented by the display light 921. This display architecture causes the light engine 920 to be closer to the front of WHUD 900 than the light engine 620 of WHUD 600, for example.

As an alternative example, light engine 920 could be carried by first arm 911, to output display light 921 towards the front frame 913. Front frame 913 could carry a redirector which receives display light 921 from the light engine 920 and redirects display light 921 into a periphery of transparent combiner 940. Such a redirector could comprise for example a reflector, a static mirror, a dynamic mirror such as a controllable scan mirror, a refractor, a prism, or any other light redirector as appropriate for a given application.

In FIG. 9, the size of protrusion 911b can be kept to a minimum since the components carried by protrusion 911b are minimized. For example, if only the ambient light sensor 930 is carried by protrusion 911b, as is shown in FIG. 9, the size of protrusion 911b can be quite small. However, it may be advantageous to incorporate additional hardware into the protrusion, as shown in FIGS. 10 and 11 discussed below.

Figure 10:
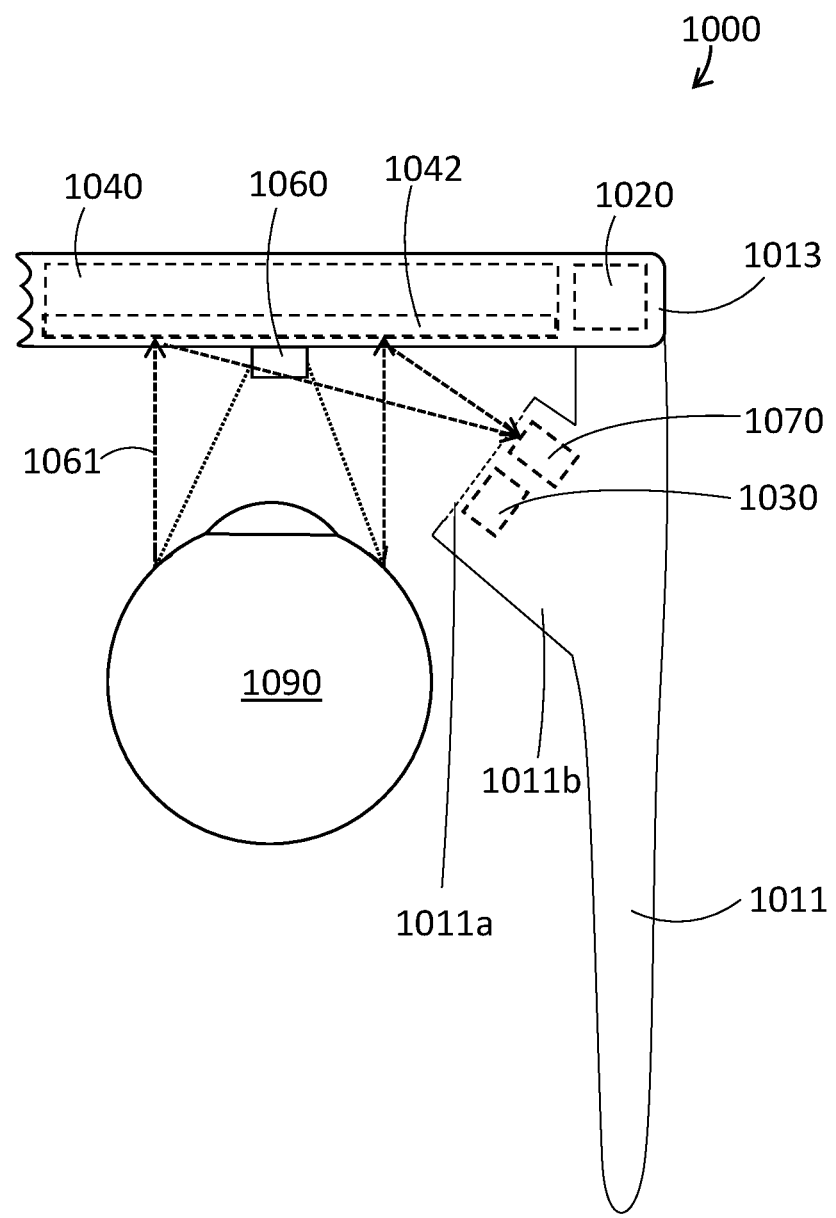
FIG. 10 is a partial top view of a WHUD which includes an exemplary user eye tracking system.
Figure 11:
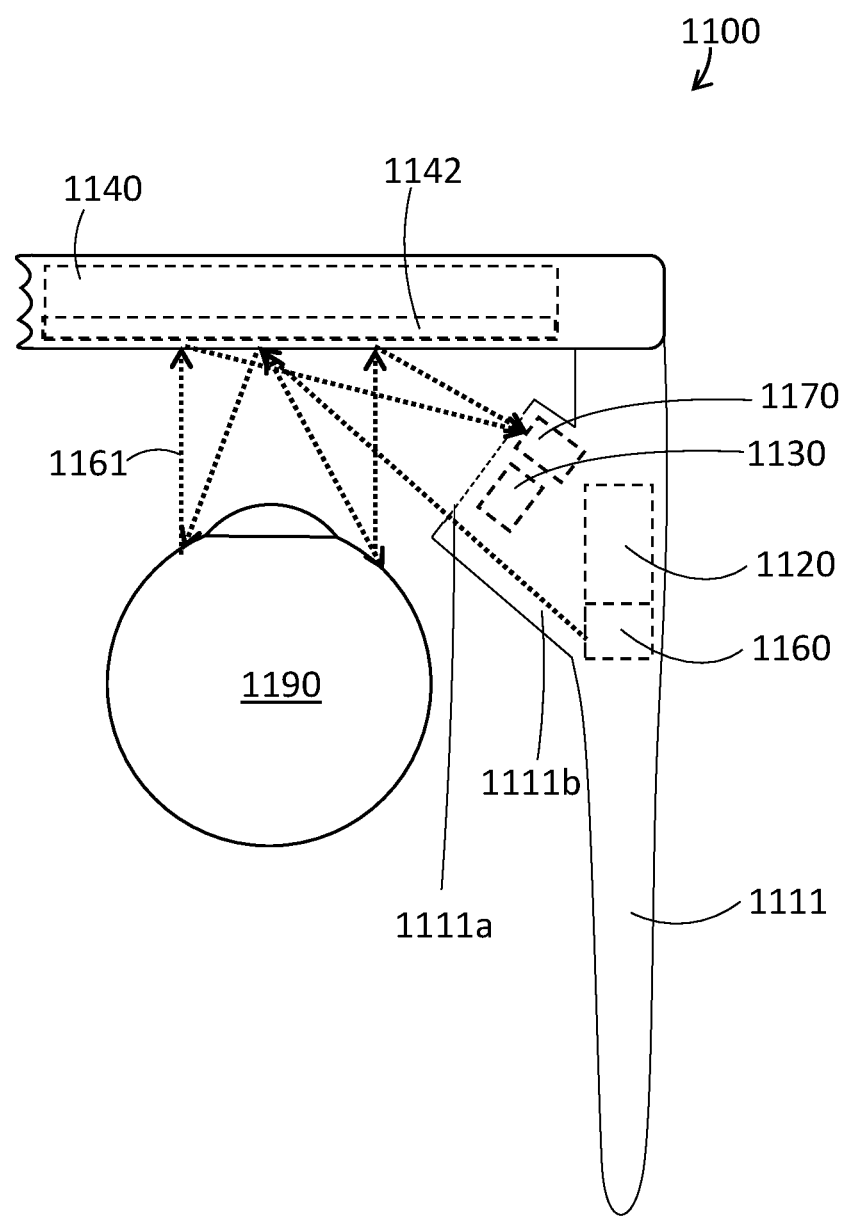
FIG. 11 is a partial top view of a WHUD which includes an alternative user eye tracking system.

FIG. 10 is a partial top view of a WHUD 1000 positioned relative to a user eye 1090 in accordance with an exemplary implementation. WHUD 1000 is similar in some respects to WHUD 900 illustrated in FIG. 9, where WHUD 1000 adds a user eye tracking system. One skilled in the art will appreciate that the description regarding FIG. 9 is applicable to FIG. 10. In particular, WHUD 1000 as illustrated in FIG. 10 includes first arm 1011 physically coupled to front frame 1013, first arm 1011 having a protrusion 1011b which carries ambient light sensor 1030, and front frame 1013 carrying light engine 1020 and transparent combiner 1040. Protrusion 1011b also includes an opening 1011a to allow light to pass therethrough. Though not explicitly illustrated, WHUD 1000 may also include at least one processor and a non-transitory processor-readable storage medium similar to that in WHUD 200 in FIG. 2. To avoid clutter, FIG. 10 does not explicitly illustrate ambient light, but the descriptions relating to ambient light in FIG. 5 are applicable to FIG. 10. Further, FIG. 10 also does not illustrate the optical path of display light output by light engine 1020 to reduce clutter, but the description related to said optical path in FIG. 9 are applicable to FIG. 10.

One difference between FIG. 10 and FIG. 9 is that FIG. 10 adds a user eye tracking system, which includes infrared light source 1060 carried by front frame 1013, an infrared detector 1070 carried by protrusion 1011b, and an infrared redirector 1042 carried by transparent combiner 1040. Infrared redirector 1042 could for example by a hologram responsive to infrared light in a narrow waveband corresponding to a narrow waveband of infrared light emitted by the infrared light source 1060. Infrared redirector 1042 could also be any other appropriate component capable of redirecting infrared light, such as reflective strips or a diffraction grating, for example. Infrared light source 1060 outputs infrared light 1061 towards user eye 1090. Infrared redirector 1042 can receive infrared light reflected from user eye 1090 and redirect the received infrared light towards infrared detector 1070 through opening 1011a. Infrared detector 1070 captures infrared light impingent thereon, and can be responsive to only infrared light within a narrow waveband corresponding to a narrow waveband of infrared light emitted by the infrared light source, if appropriate for a given application. The captured infrared light data can be analyzed by at least one processor to determine position and/or movement of user eye 1090, thus providing an eye tracking system. Exemplary eye tracking systems which could be employed within the context of the present disclosure include at least U.S. Non-Provisional patent application Ser. No. 15/167,458, U.S. Non-Provisional patent application Ser. No. 15/827,667, and U.S. Provisional Patent Application Ser. No. 62/658,436.

One skilled in the art will appreciate that although FIG. 10 shows infrared light source 1060 as being carried by front frame 1013 directly in front of the user eye 1090, infrared light source 1060 could be carried anywhere on WHUD 1000 as appropriate for a given application. As an example, infrared light source could be positioned adjacent to light engine 1020, such that infrared light is output into a periphery of transparent combiner 1040, to be guided therethrough to an outcoupler which redirects the infrared light towards and eye of the user. Infrared light source could also be integrated within light engine 1020.

FIG. 11 illustrates an example of an alternative eye tracking system. FIG. 11 is a partial top view of a WHUD 1100 positioned relative to a user eye 1190, similar in some respects to WHUD 600 illustrated in FIG. 6, where WHUD 1100 adds a user eye tracking system. One skilled in the art will appreciate that the description regarding FIG. 6 is applicable to FIG. 11. In particular, WHUD 1100 as illustrated in FIG. 11 includes first arm 1111 physically coupled to front frame 1113, first arm 1111 carrying light engine 1120 and having a protrusion 1111b which carries ambient light sensor 1130, and front frame 1113 carrying transparent combiner 1140. Protrusion 1111b also includes an opening 1111a to allow light to pass therethrough. Though not explicitly illustrated, WHUD 1100 may also include at least one processor and a non-transitory processor-readable storage medium similar to that in WHUD 200 in FIG. 2. To avoid clutter, FIG. 11 does not explicitly illustrate ambient light, but the descriptions relating to ambient light in FIG. 5 are applicable to FIG. 11. Further, FIG. 11 also does not illustrate the optical path of display light output by light engine 1120 to reduce clutter, but the descriptions related to said optical path in FIGS. 6, 7, and 8 are applicable to FIG. 11.

One difference between FIG. 11 and FIG. 6 is that FIG. 11 adds a user eye tracking system, which includes an infrared light source 1160 integrated in light engine 1120, infrared redirector 1142 carried by transparent combiner 1140, and infrared detector 1170 carried by protrusion 1111a. Infrared redirector 1042 could for example by a hologram responsive to infrared light in a narrow waveband corresponding to a narrow waveband of infrared light emitted by the infrared light source 1060. Infrared redirector 1042 could also be any other appropriate component capable of redirecting infrared light, such as reflective strips or a diffraction grating, for example. Infrared light source 1160 outputs infrared light 1161 through opening 1111a towards infrared redirector 1142, which in turn redirects infrared light 1161 towards user eye 1190. Infrared redirector 1142 receives infrared light reflected from user eye 1190, and redirects the received infrared light towards infrared detector 1170 through opening 1111a. Infrared detector 1170 captures infrared light impingent thereon, and can be responsive to only infrared light within a narrow waveband corresponding to a narrow waveband of infrared light emitted by the infrared light source, if appropriate for a given application. The captured infrared light data can be analyzed by at least one processor to determine position and/or movement of user eye 1190, thus providing an eye tracking system.

Figure 12:
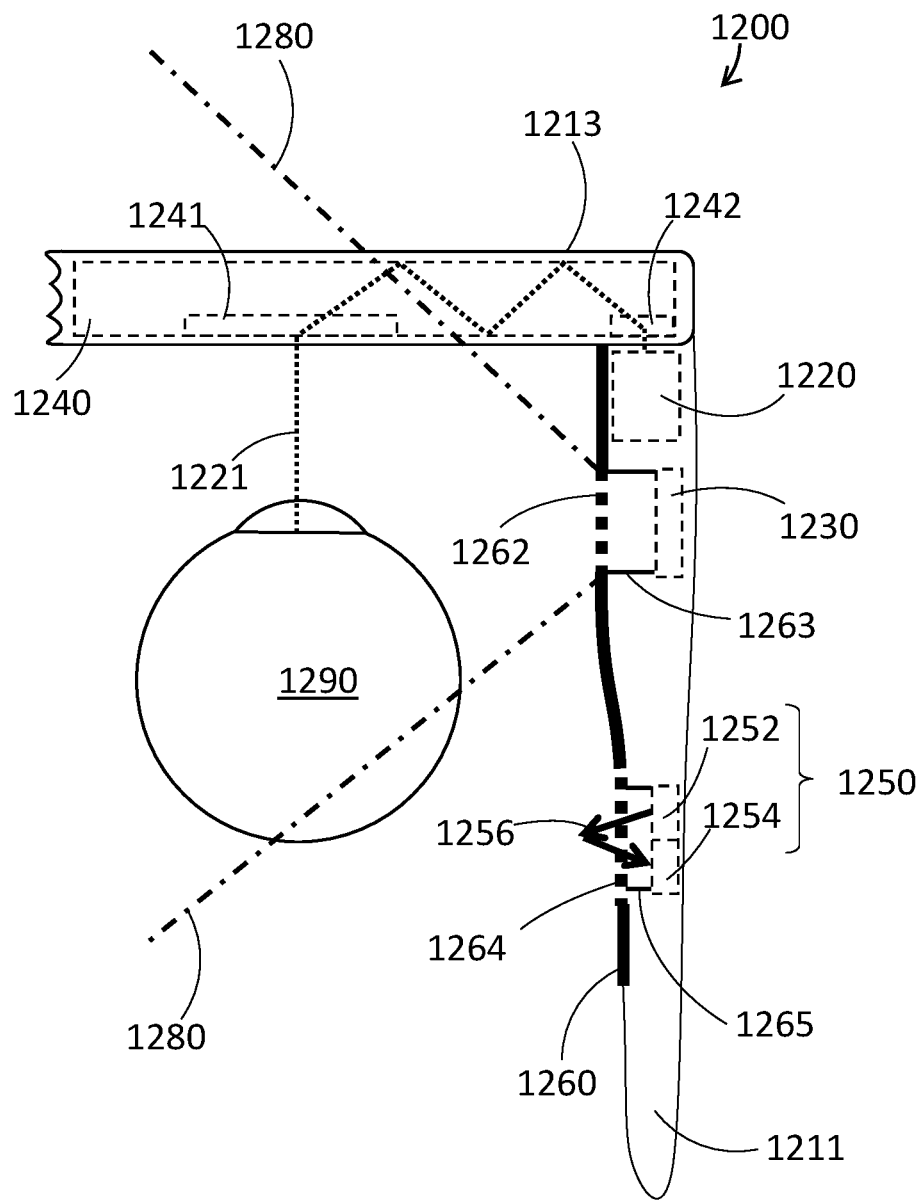
FIG. 12 is a partial top view of a WHUD which includes a proximity sensor and multiple light-passage openings.

FIG. 12 is a partial top view of a WHUD 1200 positioned relative to a user eye 1290 in accordance with an exemplary implementation. WHUD 1200 is similar in some respects to WHUD 300 illustrated in FIG. 3, and one skilled in the art will appreciate that much of the description regarding FIG. 3 is applicable to FIG. 12. In particular, WHUD 1200 as illustrated in FIG. 12 includes first arm 1211 physically coupled to front frame 1213, and WHUD 1200 carries light engine 1220, ambient light sensor 1230, and transparent combiner 1240. Though not explicitly illustrated, WHUD 1200 may also include at least one processor and a non-transitory processor-readable storage medium similar to WHUD 300. Further, although not explicitly illustrated, ambient light in FIG. 12 could have similar properties and follow similar paths to ambient light 380 in FIG. 3.

A first difference between FIG. 12 and FIG. 3 is that WHUD 1200 includes a proximity sensor 1250, which can detect when WHUD 1200 is positioned on a head of a user. The exemplary proximity sensor 1250 in FIG. 12 includes a light output module 1252 and a light detection module 1254 carried within first arm 1211. The light output module 1252 can output light 1256, which is reflected by the user's head when WHUD 1200 is being worn, and subsequently detected by light detection module 1254. If light detection module 1254 does not detect light 1256, proximity sensor 1250 can indicate or determine that WHUD 1200 is not being worn by a user. Proximity sensor 1250 can be operated continuously, intermittently, or on an as-needed basis, depending on a given application. Further, although light output module 1252 and light detection module 1254 are shown together in FIG. 12, these modules could be spatially separate. Further still, a separate opening could be provided for each of the light output module 1252 and the light detection module 1254. Further still, any of the WHUDs described herein could include a proximity sensor, such as that shown in FIG. 12. Additionally, the details of the proximity sensor in FIG. 12 are exemplary, and alternative proximity sensors could be employed as appropriate for a given application.

A second difference between FIG. 12 and FIG. 3 is that, in addition to a first opening 1262 which allows ambient light to enter first arm 1211 and impinge on ambient light sensor 1230, a second opening 1264 is provided which allows output light 1256 from light output module 1252 of proximity sensor 1250 to exit and reenter first arm 1211. Further, both first opening 1262 and second opening 1264 can be formed in a monolithic wall 1260 of first arm 1211. That is, monolithic wall 1260 can be a single continuous component, with first opening 1262 and second opening 1264 therein. In some implementations, first opening 1262 and second opening 1264 could be open and uncovered holes cut, etched, or molded into wall 1260. In other implementations, first opening 1262 and second opening 1264 could be covered by windows. For example, first opening 1262 and second opening 1264 could be holes cut, etched, or molded into wall 1260, and transparent, translucent, or tinted material could be inserted therein or thereon to seal each opening but still allow light therethrough. In another example, wall 1260 could be made of a transparent, translucent, or tinted material, and wall 1260 could be covered in an opaque coating or cladding except for the areas of first opening 1262 and second opening 1264. In some implementations, first arm 1211 could be formed as a single continuous piece of material, with first opening 1262, second opening 1264, and any other desired openings formed therein afterwards.

Advantageously, by forming wall 1260 from continuous material, sealing of first arm 1211 can be improved and simplified. This can make manufacturing easier (such as resulting in fewer assembly steps), and can prevent dust, water, and moisture from entering into first arm 1211.

A third difference between FIG. 12 and FIG. 3 is that WHUD 1200 of FIG. 12 includes a first light pipe 1263 and a second light pipe 1265. First light pipe 1263 guides ambient light between first opening 1262 and ambient light sensor 1230. Second light pipe 1265 guides output light 1256 between proximity sensor 1250 and second opening 1264. Such light pipes could be included in any of the implementations discussed herein.

A fourth difference between FIG. 12 and FIG. 3 is that WHUD 1200 includes additional details regarding a possible positioning and functionality of an exemplary light engine and display architecture. In particular, in FIG. 12, transparent combiner 1240 is a lightguide, which includes an outcoupler 1241 and an incoupler 1242. Light engine 1220 outputs display light 1221, which is incoupled into the lightguide by incoupler 1242. Display light 1221 is guided through the light guide by total internal reflection, until display light impinges on outcoupler 1241. Outcoupler 1241 outcouples at least a portion of display light 1221 from the lightguide, to travel towards an eye 1290 of a user. One skilled in the art will appreciate that the display architecture shown in FIG. 12 is exemplary, and could be replaced by other appropriate display architectures, such as those illustrated in FIG. 6, 7, 8, or 9. Similarly, the display architecture shown in FIG. 12 could be implemented in the other WHUDs described herein.

FIG. 12 also illustrates an exemplary range of angles of ambient light 1280 which may enter first opening 1262, to impinge on ambient light sensor 1230. Because of the symmetrical shape of opening 1262 and first light pipe 1263 illustrated in FIG. 12, the range of angles of ambient light 1280 which impinge on ambient light sensor 1230 may also be symmetrical. However, as illustrated in FIG. 12, this range of angles may not be ideal, as the received range of angles may not match the gaze direction of the user as close as may be desired. In the example of FIG. 12, the range of angles of received light is generally left facing, whereas the gaze direction of the user is generally forward facing. It may be desirable to receive ambient light from a more forward direction of the WHUD, for example ambient light which passes through transparent combiner 1240, ideally even at angles which are parallel to first arm 1211. FIGS. 13, 14, 15, 16, and 17 illustrate several exemplary implementations which aim to improve the range of angles of ambient light which impinge on an ambient light sensor within an arm of a WHUD.

Figure 13:
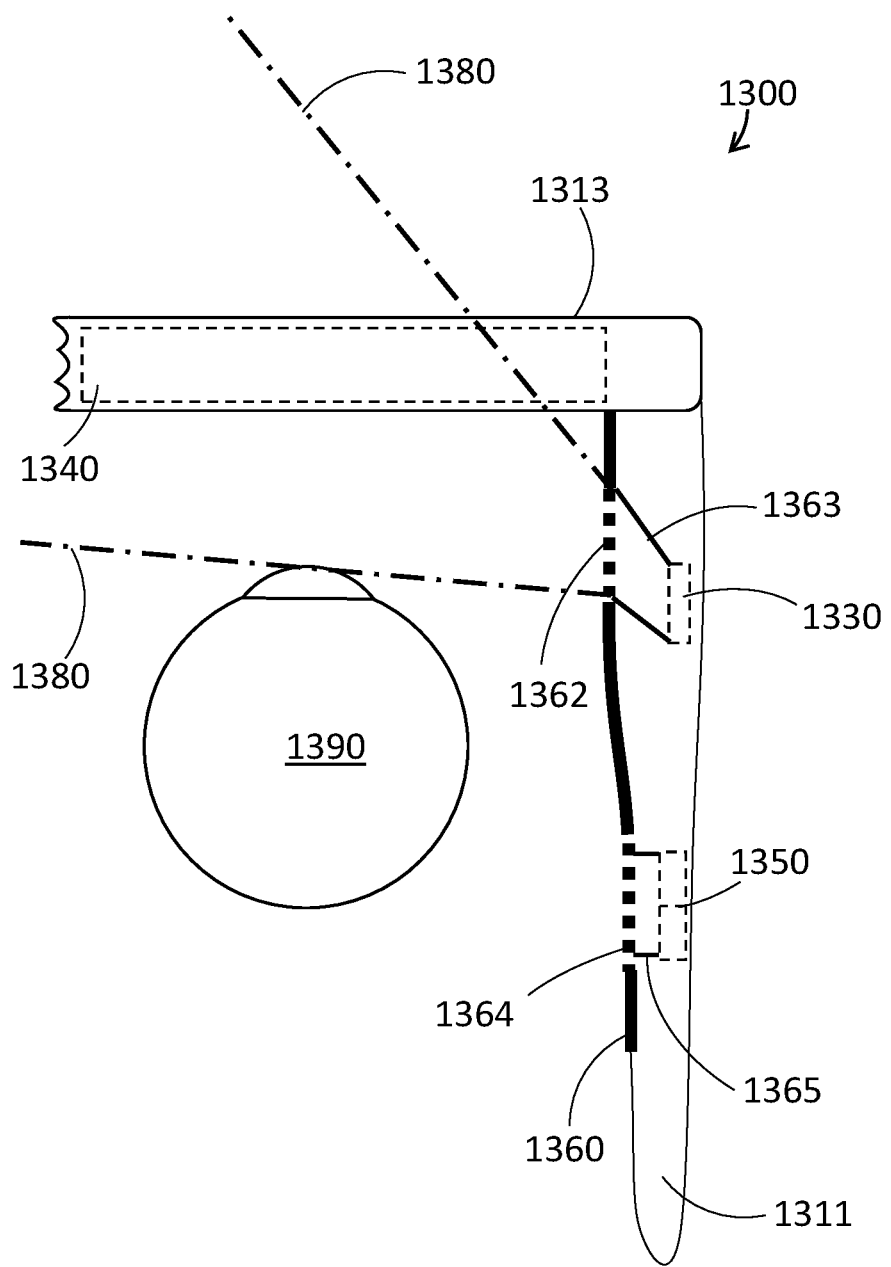
FIG. 13 is a partial top view of a WHUD which includes a light pipe designed to guide ambient light to an ambient light sensor.

FIG. 13 is a partial top view of a WHUD 1300 positioned relative to a user eye 1390 in accordance with an exemplary implementation. WHUD 1300 is similar in some respects to WHUD 1200 illustrated in FIG. 12, and one skilled in the art will appreciate that much of the description regarding FIG. 12 is applicable to FIG. 13. In particular, WHUD 1300 as illustrated in FIG. 13 includes first arm 1311 physically coupled to front frame 1313, and WHUD 1300 carries ambient light sensor 1330, transparent combiner 1340, proximity sensor 1350, wall 1360 with first opening 1362 and second opening 1364 therein, first light pipe 1363 and second light pipe 1365. Though not explicitly illustrated, WHUD 1300 may also include a light engine, at least one processor, and a non-transitory processor-readable storage medium similar to WHUD 1200.

One difference between WHUD 1300 and WHUD 1200 is that in WHUD 1300, first light pipe 1363 is shown as being shaped to optimize guiding of ambient light to ambient light sensor 1330. In the example of FIG. 13, first light pipe 1363 is shown with a slanted shape, such that first light pipe 1363 generally faces more forwards. This will result in ambient light originating from a forward direction being more prone to total internal reflection within first light pipe 1363, such that such forward-originating ambient light is guided to ambient light sensor 1330. Consequently, angles of incident light 1380 which are received by ambient light sensor 1330 will be oriented in more of a forward direction than angles 1280 illustrated in FIG. 12. Additionally, first light pipe 1363 is shown as being tapered, with a larger end at first opening 1363 and a smaller end at ambient light sensor 1330. This way, first opening 1362 can be larger to receive a greater amount of ambient light, which can then be funneled to a smaller ambient light sensor 1330.

Similar light pipe design techniques can be applied to second light pipe 1365, as appropriate for a given application.

Figure 14:
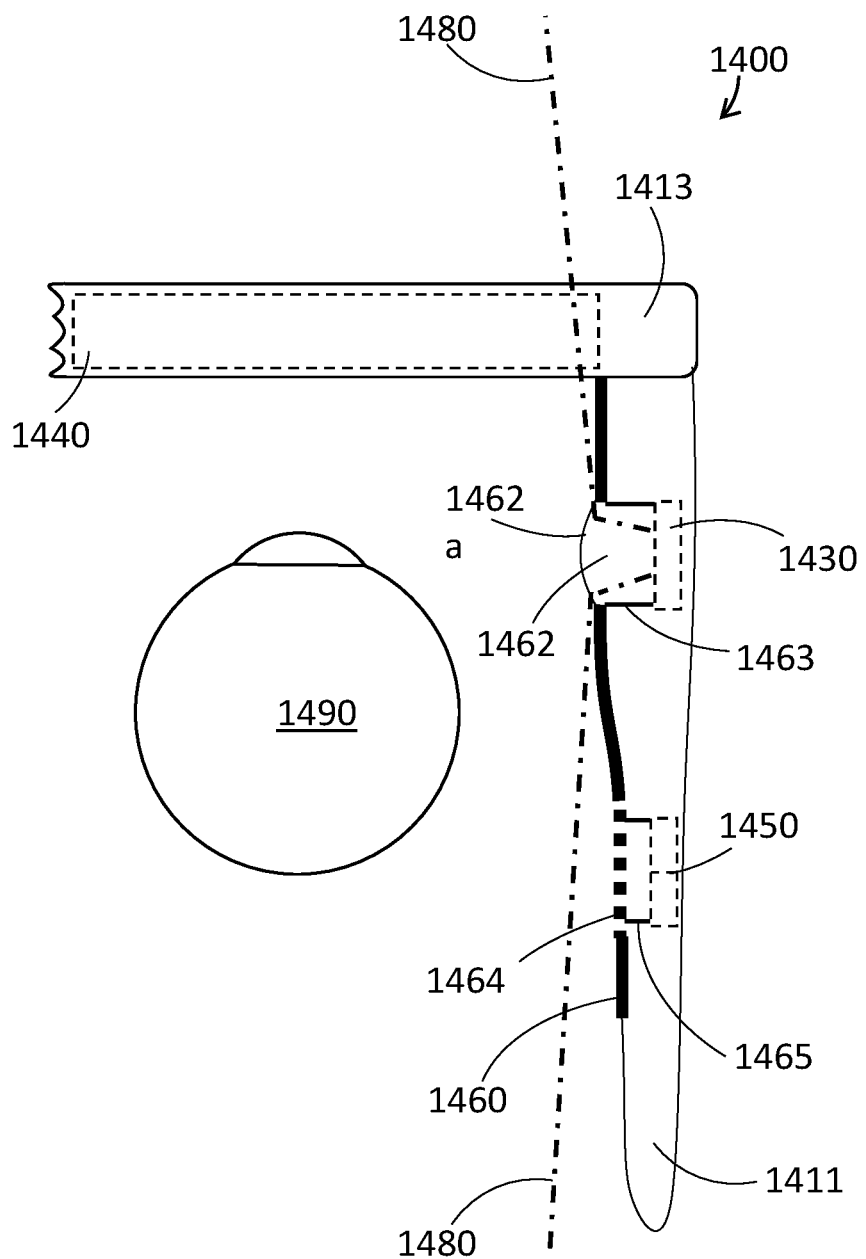
FIGS. 14, 15, 16, and 17 are partial top views of WHUDs which include optical elements to redirect ambient light towards an ambient light sensor.

FIG. 14 is a partial top view of a WHUD 1400 positioned relative to a user eye 1490 in accordance with an exemplary implementation. WHUD 1400 is similar in some respects to WHUD 1200 illustrated in FIG. 12, and one skilled in the art will appreciate that much of the description regarding FIG. 12 is applicable to FIG. 14. In particular, WHUD 1400 as illustrated in FIG. 14 includes first arm 1411 physically coupled to front frame 1413, and WHUD 1400 carries ambient light sensor 1430, transparent combiner 1440, proximity sensor 1450, wall 1460 with first opening 1462 and second opening 1464 therein, first light pipe 1463 and second light pipe 1465. Though not explicitly illustrated, WHUD 1400 may also include a light engine, at least one processor, and a non-transitory processor-readable storage medium similar to WHUD 1200.

One difference between WHUD 1400 and WHUD 1200 is that in WHUD 1400, a first optical element 1462*a* is positioned to redirect ambient light into first opening 1462. In the example of FIG. 14, first optical element 1462*a* is a convex lens shape which protrudes from wall 1460. This protrusion and optical power results in ambient light which would otherwise miss opening 1462 instead impinging on first optical element 1462*a*, and being redirected into opening 1462, to be received by ambient light sensor 1430. FIG. 14 illustrates exemplary angles 1480 of ambient light which could be received by ambient light sensor 1430.

In implementations such as WHUD 1400 in FIG. 14, first optical element 1462*a* and first light pipe 1463 could be formed together as a single component. Similar optical elements could also be applied to second opening 1464, as appropriate for a given application.

Figure 15:
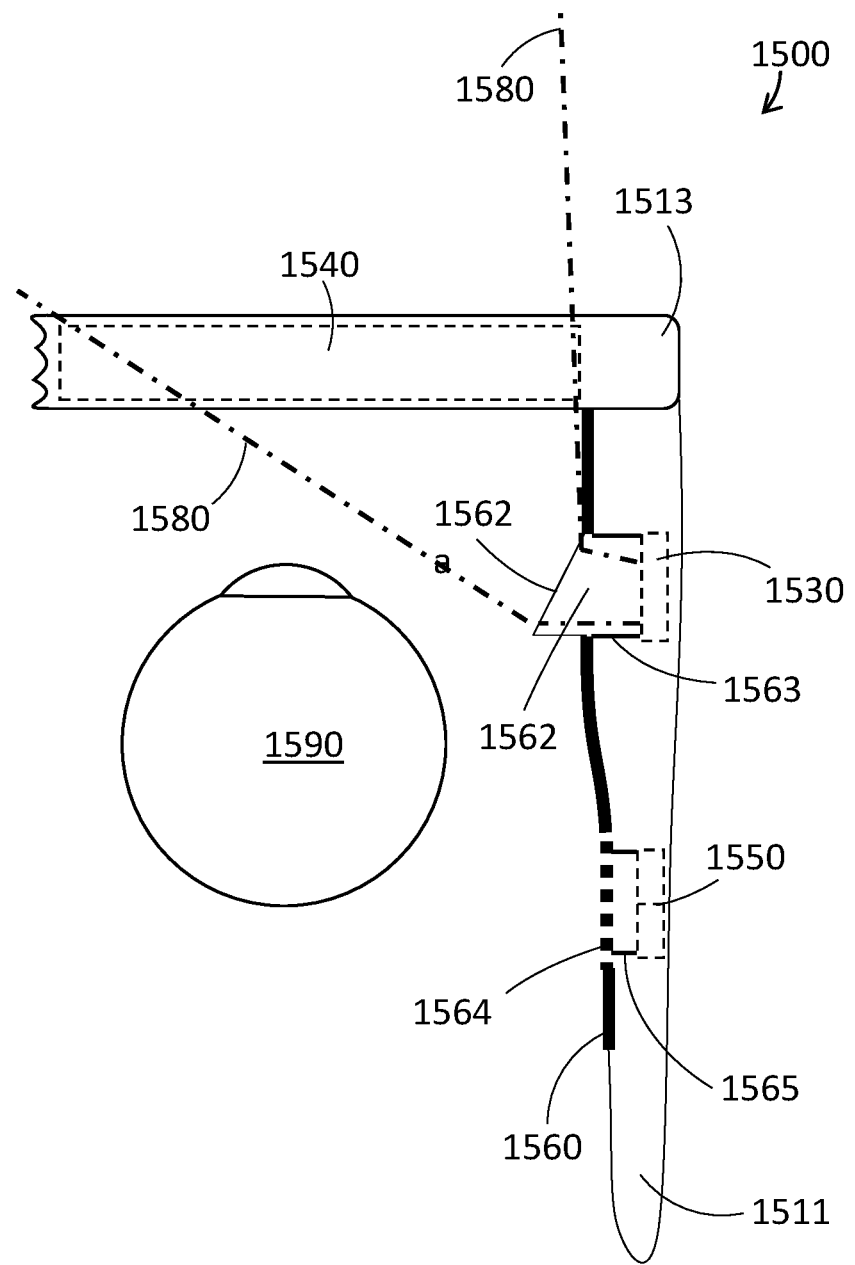

FIG. 15 is a partial top view of a WHUD 1500 positioned relative to a user eye 1590 in accordance with an exemplary implementation. WHUD 1500 is similar in some respects to WHUD 1400 illustrated in FIG. 14, and one skilled in the art will appreciate that much of the description regarding FIG. 14 is applicable to FIG. 15. In particular, WHUD 1500 as illustrated in FIG. 15 includes first arm 1511 physically coupled to front frame 1513, and WHUD 1500 carries ambient light sensor 1530, transparent combiner 1540, proximity sensor 1550, wall 1560 with first opening 1562 and second opening 1564 therein, first light pipe 1563 and second light pipe 1565. Though not explicitly illustrated, WHUD 1500 may also include a light engine, at least one processor, and a non-transitory processor-readable storage medium similar to WHUD 1400.

In FIG. 15, a first optical element 1562*a* is positioned to redirect ambient light into first opening 1562. One difference between WHUD 1500 and WHUD 1400 is that in WHUD 1500, first optical element 1562*a* is an asymmetrical prism shape. That is, first optical element 1562*a* is a prism which protrudes from wall 1560, with the prism being angled to face forward towards transparent combiner 1540. This angled prism structure acts to redirect ambient light which passes through transparent combiner 1540 towards ambient light sensor 1530, while also limiting ambient light from a rear direction from being redirected to ambient light sensor 1530. In this way, the light received by ambient light sensor 1530 can closely approximate the light which is seen by a user. FIG. 15 illustrates exemplary angles 1580 of ambient light which could be received by ambient light sensor 1530.

Although first optical element 1562*a* is illustrated in FIG. 15 with sharp edges, but this is not necessarily the case. For example, sharp edges could be rounded, and planar surfaces could be curved.

Similar to as mentioned above regarding FIG. 14, in implementations such as WHUD 1500 in FIG. 15, first optical element 1562*a* and first light pipe 1563 could be formed together as a single component. Similar optical elements could also be applied to second opening 1564, as appropriate for a given application.

Figure 16:
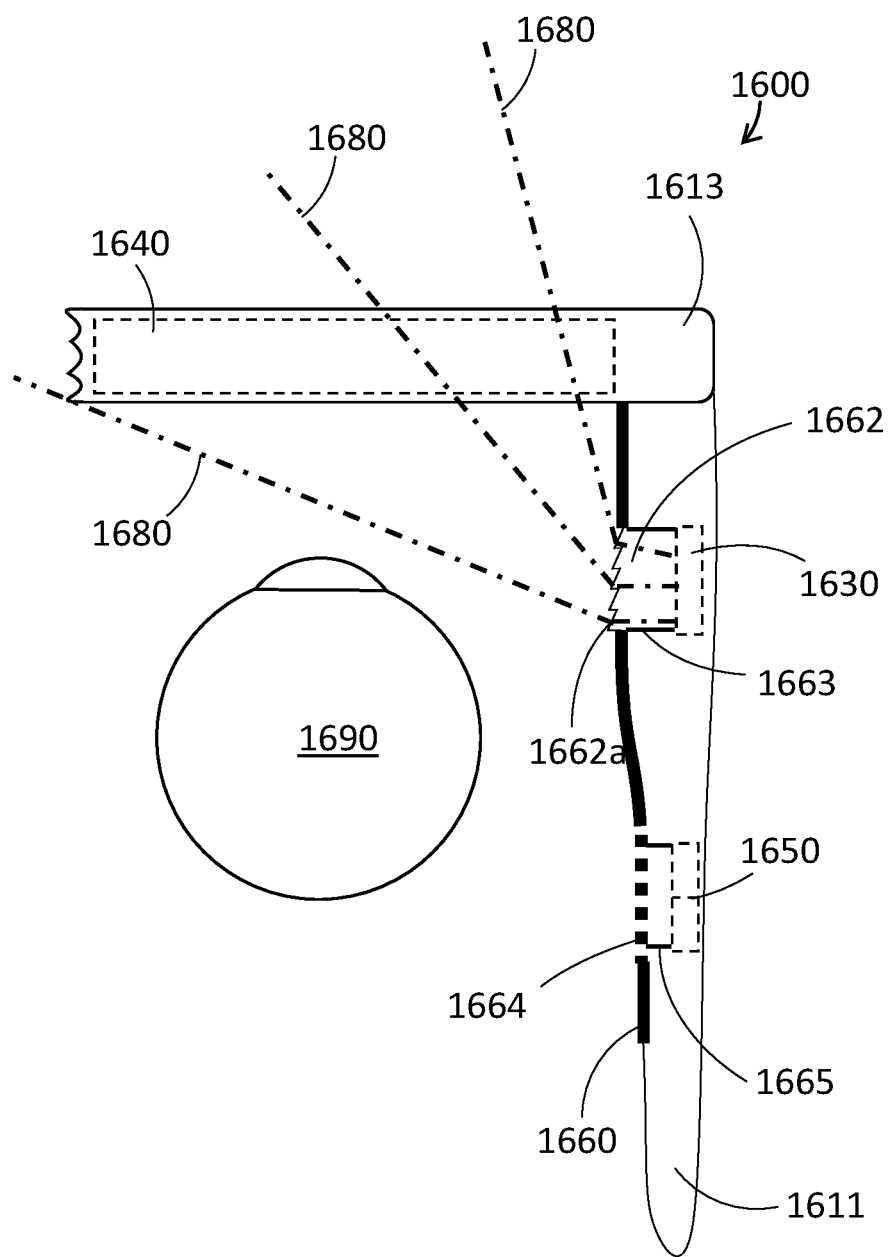

FIG. 16 is a partial top view of a WHUD 1600 positioned relative to a user eye 1690 in accordance with an exemplary implementation. WHUD 1600 is similar in some respects to WHUD 1500 illustrated in FIG. 15, and one skilled in the art will appreciate that much of the description regarding FIG. 15 is applicable to FIG. 16. In particular, WHUD 1600 as illustrated in FIG. 16 includes first arm 1611 physically coupled to front frame 1613, and WHUD 1600 carries ambient light sensor 1630, transparent combiner 1640, proximity sensor 1650, wall 1660 with first opening 1662 and second opening 1664 therein, first light pipe 1663 and second light pipe 1665. Though not explicitly illustrated, WHUD 1600 may also include a light engine, at least one processor, and a non-transitory processor-readable storage medium similar to WHUD 1500.

In FIG. 16, a first optical element 1662*a* is positioned to redirect ambient light into first opening 1662. One difference between WHUD 1600 and WHUD 1500 is that in WHUD 1600, first optical element 1662*a* has a grating shape. In the example of FIG. 16, first optical element 1662*a* is a series of asymmetrical prism shapes. That is, first optical element 1662*a* includes a plurality of prisms which protrude from wall 1660, with each prism being angled to face forward towards transparent combiner 1640. These angled prism structures act to redirect ambient light which passes through transparent combiner 1640 towards ambient light sensor 1630, while also limiting ambient light from a rear direction from being redirected to ambient light sensor 1630. In this way, the light received by ambient light sensor 1630 can closely approximate the light which is seen by a user. FIG. 16 illustrates exemplary angles 1680 of ambient light which could be received by ambient light sensor 1630. Compared to the single prism structure shown in FIG. 15, the series of prisms shown in FIG. 16 can achieve similar ambient light redirection effects, but protrude less from wall 1660.

Similar to as mentioned above regarding FIG. 15, each of the prisms of first optical element 1662a is illustrated with sharp edges, but this is not necessarily the case. For example, sharp edges could be rounded, and planar surfaces could be curved. Further, although five prisms are illustrated in FIG. 16, any number of prisms could be used as appropriate for a given application.

Similar to as mentioned above regarding FIG. 14, in implementations such as WHUD 1600 in FIG. 16, first optical element 1662a and first light pipe 1663 could be formed together as a single component. Similar optical elements could also be applied to second opening 1664, as appropriate for a given application.

FIGS. 14, 15 and 16 each illustrate optical elements which redirect ambient light into an opening towards an ambient light sensor. Each of FIGS. 14, 15, and 16 focus on redirecting ambient light which passes through a transparent combiner in front of a user, but in some cases it may be desirable to gather as much ambient light as possible, even if said ambient light does not originate from a direction which the user is gazing at. To achieve this, an optical element could be included which redirects ambient light from other directions. As an example, a prism such as first optical element 1562a in FIG. 15 could be implemented, with the prism angled to face upwards. Such an implementation would redirect ambient light originating above the user towards the ambient light sensor. A convex lens such as first optical element 1462a in FIG. 14, or a grating structure such as first optical element 1662a in FIG. 16 could also be implemented to redirect light originating from directions other than in front of the user, such as above the user. Additionally, any optical element could also be shaped and oriented to redirect ambient light originating from multiple directions towards the ambient light sensor. For example, an optical element could be shaped and positioned to redirect ambient light originating in front of the user and ambient light originating above the user towards the ambient light sensor.

Figure 17:
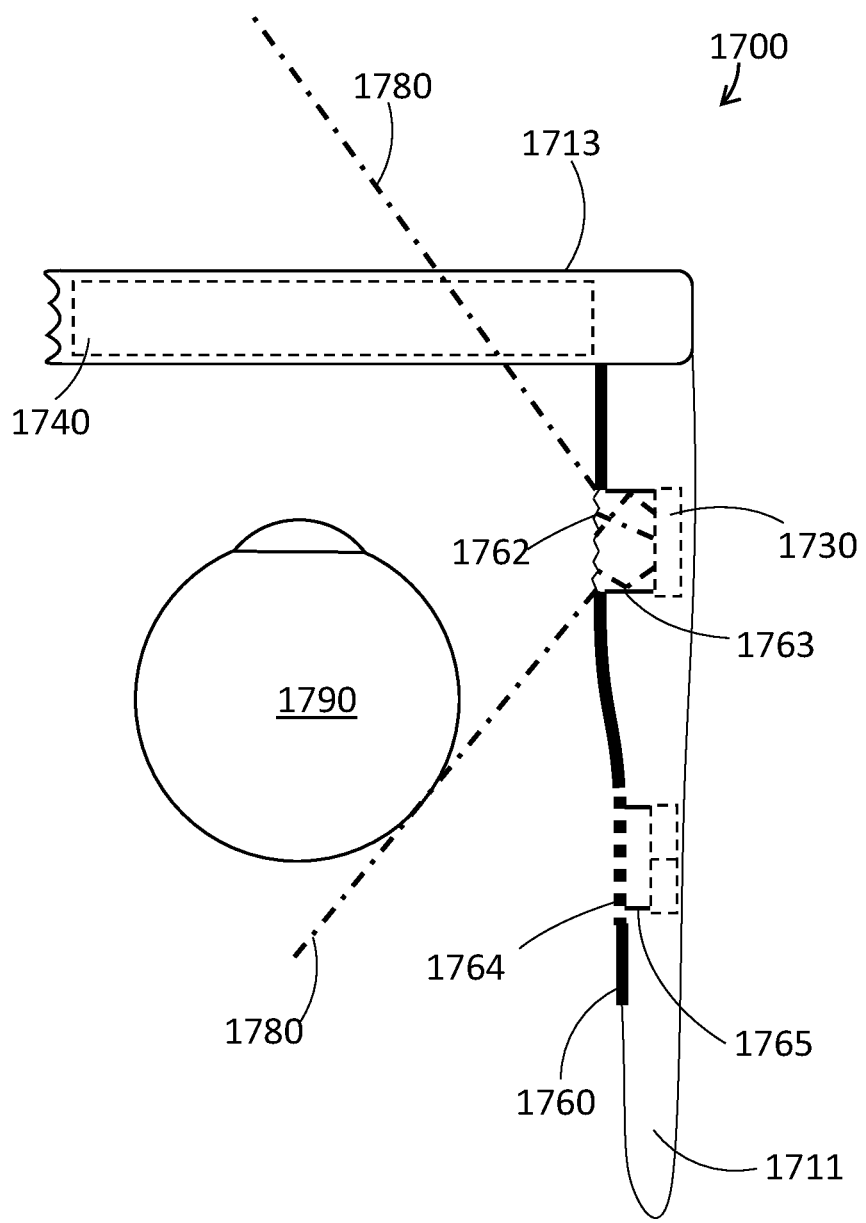

FIG. 17 is a partial top view of a WHUD 1700 positioned relative to a user eye 1790 in accordance with an exemplary implementation. WHUD 1700 is similar in some respects to WHUD 1200 illustrated in FIG. 12, and one skilled in the art will appreciate that much of the description regarding FIG. 12 is applicable to FIG. 17. In particular, WHUD 1700 as illustrated in FIG. 17 includes first arm 1711 physically coupled to front frame 1713, and WHUD 1700 carries ambient light sensor 1730, transparent combiner 1740, proximity sensor 1750, wall 1760 with first opening 1762 and second opening 1764 therein, first light pipe 1763 and second light pipe 1765. Though not explicitly illustrated, WHUD 1700 may also include a light engine, at least one processor, and a non-transitory processor-readable storage medium similar to WHUD 1200.

One difference between WHUD 1700 and WHUD 1200 is that in WHUD 1700, a surface of a window or transparent element in first opening 1762 can be roughened. For example, a surface of first light pipe 1763 which sits in first opening 1762 could be roughened. As another example, an optical element in first opening 1762, such as any of the optical elements discussed with reference to FIGS. 14, 15, and 16, could have a roughened surface. A roughened surface at first opening 1762 can diffuse ambient light which passes through first opening 1762, which will result in a more even spread of light across an area of ambient light sensor 1730. This will improve the effectiveness and accuracy of ambient light sensor 1730.

Although the implementations of FIGS. 12, 13, 14, 15, 16, and 17 each include a proximity sensor and corresponding openings, such proximity sensors and corresponding openings are not required to implement the optical elements and light pipes which guide ambient light towards the ambient light sensors.

Figure 18A:
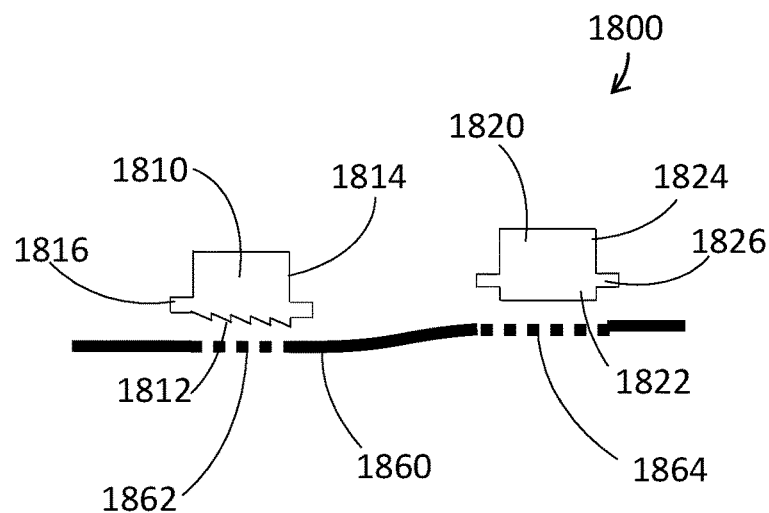
FIG. 18A is a top exploded view of a wall and optical element assembly for a WHUD.
Figure 18B:
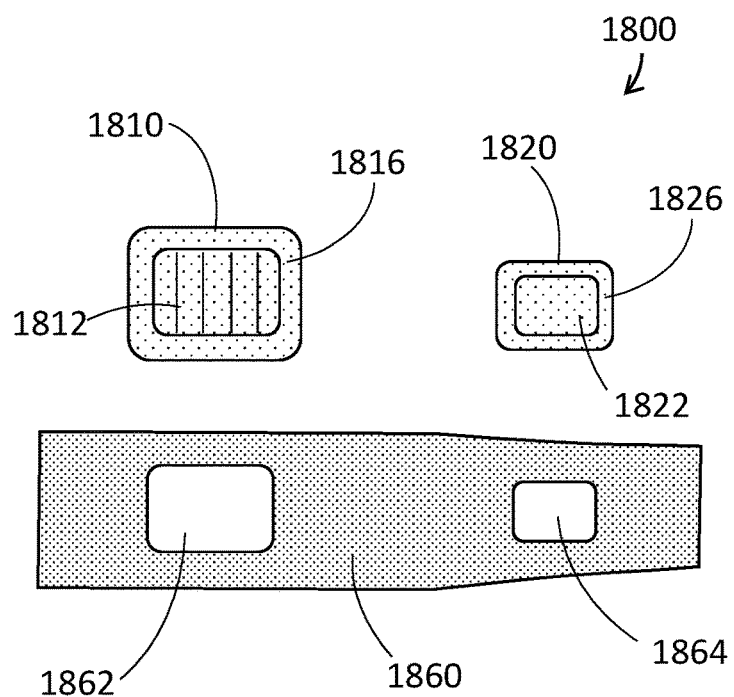
FIG. 18B is a side exploded view of the assembly of FIG. 18A.

FIG. 18A is an exploded top cutaway view of an assembly 1800. FIG. 18B is an exploded side view of the assembly 1800. Assembly 1800 includes a wall 1860, which can include at least features of any of wall 1260, 1360, 1460, 1560, 1660, or 1760 discussed above. For example, wall 1860 can include a first opening 1862 which is intended to allow ambient light to passthrough to be received by an ambient light sensor. As another example, wall 1860 can include a second opening 1864 which can allow light to pass through for a proximity sensor.

A first optical component 1810 can be provided, which is to interface with first opening 1862. In the example of FIGS. 18A and 18B, first optical component 1810 can include a first optical surface 1812, at least one light pipe wall 1814, and at least one affixing member 1816. First optical surface 1812 could include a window, or as illustrated in FIG. 18A and FIG. 18B, first optical surface 1812 could include an optical element which redirects ambient light to pass through first opening 1862. The example of FIGS. 18A and 18B shows an optical element similar to the grating structure of optical element 1662a in FIG. 16, but any optical element or combination of optical elements could be used as appropriate for a particular application, including the convex lens optical element 1462a in FIG. 14, the prism optical element 1562a in FIG. 15, or the surface roughening in FIG. 17.

Second optical component 1820 can be provided, which is to interface with second opening 1864. In the example of FIGS. 18A and 18B, second optical component 1820 can include a second optical surface 1822, at least one light pipe wall 1824, and at least one affixing member 1826. Second optical surface 1822 could include a window as illustrated in FIG. 18A, or second optical surface 1822 could include an optical element which influences light passing through second opening 1864.

Each of FIGS. 18A and 18B illustrate first optical component 1810 as including at least one affixing member 1816, and second optical component 1820 as including at least one affixing member 1826. Each of these affixing members aids in positioning and affixing the respective optical component to wall 1860. In the example of FIGS. 18A and 18B, each affixing member is a flange which will butt against wall 1860 when the respective optical component is put in position. Such a flange can be affixed to wall 1860 using for example adhesive, mechanical fasteners, clips, or any appropriate affixing mechanism. However, affixing members 1816 and 1826 are not necessary. Instead, first optical component 1810 could be affixed directly in first opening 1862, and second optical component 1820 could be affixed directly in second opening 1864. For example, adhesive could be used to adhere each optical component to a respective opening. Alternatively, each optical component could be held in place by a friction fit.

Figure 19A:
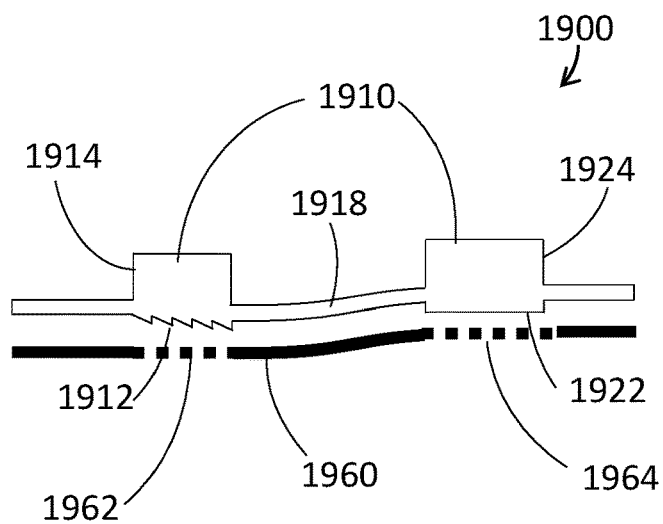
FIG. 19A is a top exploded view of a wall and optical element assembly for a WHUD.
Figure 19B:
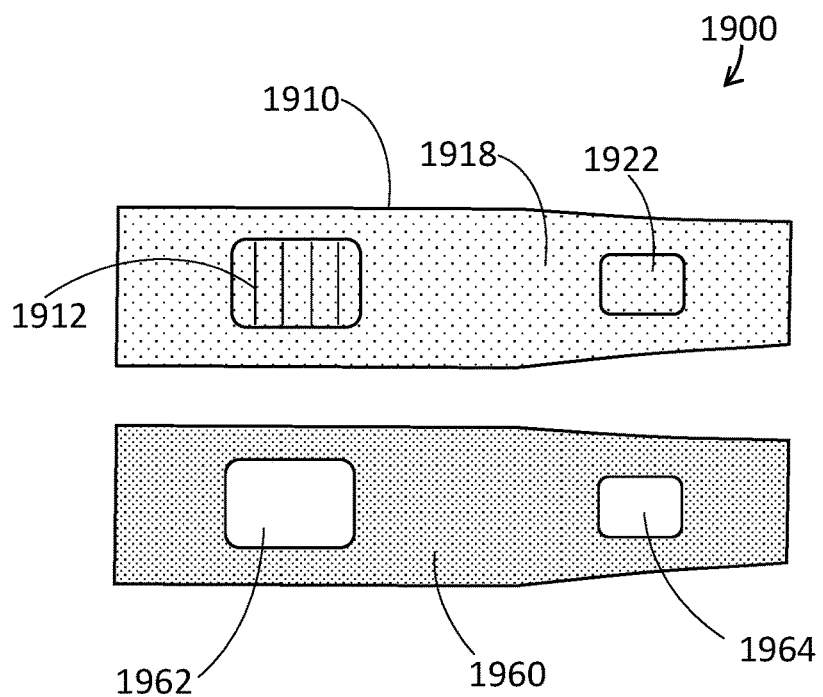
FIG. 19B is a side exploded view of the assembly of FIG. 19A.

FIG. 19A is an exploded top cutaway view of an assembly 1900. FIG. 19B is an exploded side view of assembly 1900. Assembly 1900 can be similar in at least some respects to assembly 1800 shown in FIGS. 18A and 18B, and one skilled in the art will appreciate that much of the description of assembly 1800 can be applicable to assembly 1900. For example, FIGS. 19A and 19B illustrate that assembly 1900 can include a wall 1960 having a first opening 1962 and a second opening 1964 therein. One difference between assembly 1900 and assembly 1800 is that assembly 1900 can combine first optical component 1810 and second optical component 1820 into a single optical component 1910. Optical component 1910 can include first optical surface 1912, second optical surface 1922, first light pipe walls 1914, second light pipe walls 1924, and joining member 1918. First optical surface 1912 can be similar to first optical surface 1812 discussed above, and second optical surface 1922 can be similar to second optical surface 1822 discussed above. Joining member 1918 can hold optical component 1910 together such that only a single optical component needs to be aligned and affixed to wall 1960. Joining member 1918 could for example be a strut or strip, or as illustrated in FIGS. 19A and 19B, joining member 1918 could be similar in size and shape to wall 1960. Sizing joining member 1918 to be similar to wall 1960 advantageously improves sealing of a WHUD which includes optical component 1910 and wall 1960, in that only a single seal around the edge of optical component 1910 needs to achieve dust resistance and water resistance, and wall 1960 can be a cladding overtop. In an assembly with separate optical components, a seal would need to be established between each optical component and the wall, and a seal would need to be established between the wall and the rest of a WHUD housing.

To manufacture an optical component 1910 which affixes to a WHUD housing and a wall 1960 which is a cladding thereon, the optical component 1910 could be first formed, then wall 1960 could be overmolded thereon to ensure matching geometries. Alternatively, wall 1960 could first be formed, and optical component 1910 could be molded therein. As another alternative, optical component 1910 and wall 1960 could be separately formed and subsequently assembled together.

Figure 20:
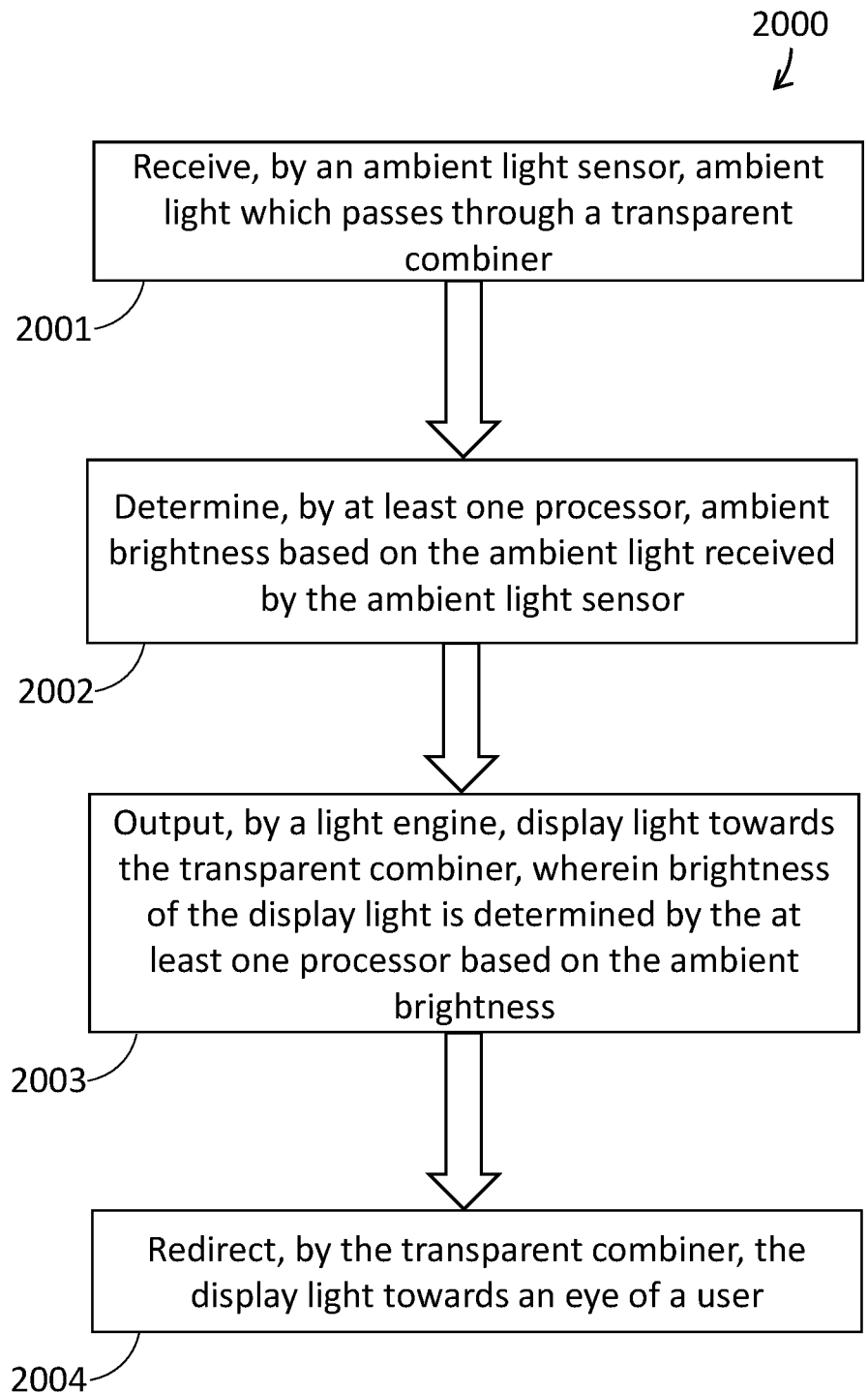
FIG. 20 is a flow diagram which illustrates an exemplary method in accordance with the present disclosure.

FIG. 20 is a flow diagram which illustrates an exemplary method 2000 in accordance with the present disclosure. Method 2000 can be implemented with any of the hardware implementations shown in FIG. 1, 2, 3, 4, 5, 6, 7, 8, 9, 10, 11, 12, 13, 14, 15, 16, or 17 above, or any other appropriate WHUD configurations having a light engine, a transparent combiner which allows ambient light to pass therethrough, an ambient light sensor positioned on a user-side of the transparent combiner, and either at least one processor or the ability to communicate with at least one remote processor. Method 2000 includes acts 2001, 2002, 2003, and 2004. In act 2001 the ambient light sensor receives ambient light which passes through the transparent combiner. In act 2002, the at least one processor determines an ambient brightness based on the amount of light received by the ambient light sensor. By positioning the ambient light sensor on a user-side of the transparent combiner, such that the ambient light sensor receives ambient light which passes through the transparent combiner, the determined ambient brightness can closely represent ambient brightness as perceived by the user. In act 2003, the light engine outputs display light towards the transparent combiner, wherein the at least one processor determines brightness and/or power of the display light based on the ambient brightness. As non-limiting examples, act 2003 could include outputting display light from an arm of the WHUD towards the transparent combiner, similar to FIG. 6, or outputting display light into a periphery of the transparent combiner, similar to in FIG. 9, or outputting display light into an incouple of the transparent combiner, similar to in FIG. 12. In act 2004, the transparent combiner redirects the display light towards an eye of a user, thus forming a display for the user. As non-limiting examples, this could include reflecting incident display light towards a user eye, similar to in FIG. 6, or guiding display light through a lightguide and outcoupling the display light towards a user's eye, similar to as in FIGS. 9 and 12.

One skilled in the art will appreciate that the above discussed acts in method 2000 are merely exemplary, and acts can be removed, added, or reordered as is appropriate for a given application. As a non-limiting example, several acts could be added related to user eye tracking, including: an infrared light source outputting infrared light towards the user's eye, an infrared redirector carried by the transparent combiner receiving infrared light reflected from the user eye, and the infrared redirector redirecting the received infrared light towards an infrared detector, similar to in FIGS. 10 and 11.

Further, one skilled in the art will appreciate that each of the above acts could be stored as processor-readable instructions on a non-transitory processor-readable medium, which when executed by the at least one processor cause the WHUD to perform the respective act.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/145,576, U.S. Non-Provisional patent application Ser. No. 15/167,458, U.S. Non-Provisional patent application Ser. No. 15/046,254 now published as U.S. Pat. No. 9,989,764, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Non-Provisional patent application Ser. No. 15/970,631, U.S. Non-Provisional patent application Ser. No. 15/046,269, U.S. Non-Provisional patent application Ser. No. 15/046,254, U.S. Non-Provisional patent application Ser. No. 15/167,458, U.S. Non-Provisional patent application Ser. No. 15/827,667, and/or U.S. Provisional Patent Application Ser. No. 62/658,436 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
a support structure;
a transparent combiner carried by the support structure, the transparent combiner having a user-side which is to face an eye of a user when the WHUD is worn by the user and a world-side which is to face away from the eye of the user when the WHUD is worn by the user;
a light engine carried by the support structure positioned and oriented to output display light towards the transparent combiner; and
an ambient light sensor carried by a portion of the support structure which is faced by the user-side of the transparent combiner,
wherein the transparent combiner is positioned and oriented to direct the display light towards the eye of the user.

2. The WHUD of claim 1 wherein:
the support structure comprises a front frame to carry the transparent combiner in a field of view of the user's eye when the WHUD is worn by the user;
the support structure comprises at least a first arm coupled to the front frame to be positioned along a side of a user's head when the WHUD is worn by the user; and
the portion of the support structure which carries the ambient light sensor comprises a protrusion on the first arm of the support structure.

3. The WHUD of claim 2 wherein the protrusion on the first arm of the support structure carries at least a portion of the light engine.

4. The WHUD of claim 2 wherein:
the light engine includes an at least one visible laser light diode to output visible laser light in at least one visible narrow waveband;
the transparent combiner is a holographic optical element ("HOE") including a first hologram responsive to light within the visible narrow waveband and unresponsive to light outside of the visible narrow waveband, the first hologram positioned and oriented to receive visible laser light from the visible laser light diode and redirect the visible laser light towards the eye of the user.

5. The WHUD of claim 2 wherein the protrusion on the first arm of the support structure has an opening to allow light to enter and exit the protrusion, the ambient light sensor to receive ambient light which passes through the opening, and the light engine to output the display light towards the transparent combiner through the opening.

6. The WHUD of claim 5 wherein the protrusion on the first arm of the support structure carries an exit pupil replication optic positioned and oriented to split display light output by the light engine to the transparent combiner.

7. The WHUD of claim 2, further comprising:
an infrared light source carried by the support structure, the infrared light source positioned and oriented to output infrared light towards the eye of the user when the WHUD is worn by the user;
an infrared light reflector carried by the transparent combiner positioned and oriented to receive infrared light reflected from the eye of the user and to redirect the received infrared light; and
an infrared photodetector carried by the protrusion on the first arm of the support structure to capture the infrared light redirected by the infrared light reflector.

8. The WHUD of claim 7 wherein the infrared light source is to output infrared light within a first narrow waveband, wherein the infrared light reflector comprises a hologram responsive to light within the first narrow waveband and unresponsive to light outside of the first narrow waveband, and the infrared photodetector is responsive to light within the first narrow waveband and unresponsive to light outside of the first narrow waveband.

9. The WHUD of claim 1 wherein the transparent combiner comprises a lightguide and an out-coupler, wherein the lightguide is positioned and oriented to receive the display light from the light engine and direct the display light to the out-coupler, and the out-coupler is positioned and oriented to redirect the display light towards the eye of the user.

10. The WHUD of claim 1 wherein:
the support structure further comprises a front frame to carry the transparent combiner in a field of view of the user's eye when the WHUD is worn by the user;
the support structure comprises at least one arm coupled to the front frame to be positioned on a side of a user's head when the WHUD is worn by the user; and the portion of the support structure which carries the ambient light sensor comprises a flat plane substantially parallel to an axis which runs along a length of the at least one arm.

11. The WHUD of claim 1 wherein the ambient light sensor is carried within the portion of the support structure which carries the ambient light sensor, the support structure having a first opening to allow light to enter into the portion of the support structure which carries the ambient light sensor.

12. The WHUD of claim 11, further comprising an optical element protruding from the first opening.

13. The WHUD of claim 12 wherein the optical element comprises a convex lens, a prism, or a grating.

14. The WHUD of claim 11, further comprising a light pipe which guides light between the first opening and the ambient light sensor.

15. The WHUD of claim 11, further comprising a proximity sensor carried within the portion of the support structure which is faced by the user-side of the transparent combiner, wherein the portion of the support structure which is faced by the user-side of the transparent combiner comprises a second opening which allows light emitted by the proximity sensor to exit and re-enter the portion of the support structure which is faced by the user-side of the transparent combiner.

16. The WHUD of claim 15 wherein the portion of the support structure which is faced by the user-side of the transparent combiner comprises a monolithic wall which surrounds the first opening and the second opening.

17. The WHUD of claim 16 wherein the portion of the support structure which is faced by the user-side of the transparent combiner comprises a first window which covers the first opening and a second window which covers the second opening.

18. The WHUD of claim 15, further comprising:
a first light pipe which guides light between the first opening and the ambient light sensor; and
a second light pipe which guides light between the second opening and the proximity sensor.

19. The WHUD of claim 1 wherein the support structure has a general shape and appearance of eyeglasses.

20. A method of controlling a wearable heads-up display ("WHUD") having a light engine, a transparent combiner, and an ambient light sensor, the WHUD having or being communicatively coupled to at least one processor, the method comprising:
receiving, by the ambient light sensor, ambient light which passes through the transparent combiner;
determining, by the at least one processor, ambient brightness based on the ambient light received by the ambient light sensor;
outputting, by the light engine, display light towards the transparent combiner, wherein brightness of the display light is determined by the at least one processor based on the ambient brightness; and
redirecting, by the transparent combiner, the display light towards an eye of a user.

* * * * *